(12) United States Patent
Lotfi et al.

(10) Patent No.: US 10,608,890 B2
(45) Date of Patent: Mar. 31, 2020

(54) HOLISTIC VALIDATION OF A NETWORK VIA NATIVE COMMUNICATIONS ACROSS A MIRRORED EMULATION OF THE NETWORK

(71) Applicant: Tesuto Inc., Walnut, CA (US)

(72) Inventors: Hossein Lotfi, Pacific Palisades, CA (US); Jayson Sakata, Valencia, CA (US); Christopher William Bradley, Lafayette, CA (US)

(73) Assignee: Tesuto Inc., Walnut, CA (US)

( * ) Notice: Subject to any disclaimer, the term of this patent is extended or adjusted under 35 U.S.C. 154(b) by 16 days.

(21) Appl. No.: 16/171,671

(22) Filed: Oct. 26, 2018

(65) Prior Publication Data
US 2019/0068456 A1    Feb. 28, 2019

Related U.S. Application Data

(63) Continuation-in-part of application No. 15/871,627, filed on Jan. 15, 2018, which is a continuation of
(Continued)

(51) Int. Cl.
| | |
|---|---|
| *H04L 12/24* | (2006.01) |
| *G06F 9/455* | (2018.01) |
| *H04L 29/08* | (2006.01) |
| *H04L 12/46* | (2006.01) |
| *H04L 12/26* | (2006.01) |

(Continued)

(52) U.S. Cl.
CPC ........ *H04L 41/145* (2013.01); *G06F 9/45558* (2013.01); *G06F 9/5027* (2013.01); *G06F 9/5077* (2013.01); *G06F 11/07* (2013.01); *H04L 12/4675* (2013.01); *H04L 41/0873* (2013.01); *H04L 41/12* (2013.01); *H04L 43/50* (2013.01); *H04L 67/10* (2013.01); *H04L 67/34* (2013.01);
(Continued)

(58) Field of Classification Search
None
See application file for complete search history.

(56) References Cited

U.S. PATENT DOCUMENTS

| | | |
|---|---|---|
| 9,146,721 B1 | 9/2015 | Nagaraja et al. |
| 9,172,621 B1 | 10/2015 | Dippenaar |

(Continued)

*Primary Examiner* — Brian Whipple
(74) *Attorney, Agent, or Firm* — Ansari Katiraei LLP; Arman Katiraei; Sadiq Ansari

(57) ABSTRACT

A replication of a physical network is created in the cloud. The replicated network safely validates configuration changes for any hardware network device of the physical network and the physical network end state resulting from the changes without impacting the physical network steady state. The replicated network creates virtual machines on hardware resources provisioned from the cloud. The virtual machines emulate network device functionality and have the same addressing as the network devices. Nested overlay networks reproduce the direct connectivity that exists between different pairs of the network devices on the virtual machines. A first overlay network formed by a first Virtual Extensible Local Area Network (VXLAN) provides direct logical connections between the cloud machines on which the virtual machines execute. A second overlay network of VXLANs leverages the first VXLAN to establish direct logical connections between the virtual machines that mirror the direct connections between the network devices.

20 Claims, 16 Drawing Sheets

Related U.S. Application Data application No. 15/727,681, filed on Oct. 9, 2017, now Pat. No. 9,882,784.

(60) Provisional application No. 62/563,574, filed on Sep. 26, 2017.

(51) Int. Cl.
*G06F 9/50* (2006.01)
*G06F 11/07* (2006.01)

(52) U.S. Cl.
CPC .... *G06F 2009/45595* (2013.01); *H04L 41/08* (2013.01); *H04L 41/5096* (2013.01)

(56) References Cited

U.S. PATENT DOCUMENTS

| | | |
|---|---|---|
| 9,305,164 B1 | 4/2016 | Brandwine et al. |
| 2008/0307519 A1 | 12/2008 | Curcio et al. |
| 2013/0174149 A1 | 7/2013 | Dasgupta et al. |
| 2014/0177471 A1 | 6/2014 | Kharitonov et al. |
| 2014/0337837 A1 | 11/2014 | Padala et al. |
| 2016/0117231 A1 | 4/2016 | Lee et al. |
| 2017/0163599 A1 | 6/2017 | Shen et al. |

HOLISTIC VALIDATION OF A NETWORK VIA NATIVE COMMUNICATIONS ACROSS A MIRRORED EMULATION OF THE NETWORK

CLAIM OF BENEFIT TO RELATED APPLICATIONS

This application is a continuation-in-part of U.S. nonprovisional application Ser. No. 15/871,627, entitled "Holistic Validation of a Network Via Native Communications Across a Mirrored Emulation of the Network", filed Jan. 15, 2018 which is a continuation of U.S. nonprovisional application Ser. No. 15/727,681, entitled "Holistic Validation of a Network Via Native Communications Across a Mirrored Emulation of the Network", filed Oct. 9, 2017, now U.S. Pat. No. 9,882,784, which claims the benefit of U.S. provisional application 62/563,574, entitled "Holistic Validation of a Network Via Native Communications Across a Mirrored Emulation of the Network", filed Sep. 26, 2017.

TECHNICAL FIELD

The present invention relates to computer networks.

BACKGROUND ART

Network outages are primarily due to human error. More specifically, these errors are the byproduct of improper changes or unforeseen consequences from changes made to the configurations that control how network devices connect and exchange frames, packets, and other data with other network devices. Network devices such as hardware network devices, switches, load balancers, firewall appliances, etc. can produce the outages or other error conditions based on a misconfiguration. Outages occur despite best efforts to validate the configurations and configuration changes before they are deployed to the network devices.

Current validation tools and methodologies are insufficient because they do not provide a comprehensive validation of a configuration change and the impact of the change across each and every network device of the network. Laboratory testing and canary testing are two examples of widely used validation methodologies that suffer these shortcomings.

Laboratory testing provides a safe environment with which to test configuration changes apart from the actual network. Tests are conducted against a small sampling of networking hardware that is representative of the physical network devices deployed in the network. However, the network hardware used for the laboratory testing is not connected to the actual network. Accordingly, any laboratory testing validation is incomplete because it is conducted against a fractional reproduction of the actual network. This fractional reproduction cannot account for the actual topology, connectivity, or interoperation between the network devices in the actual network. The fractional reproduction also cannot identify the true end state of the network because of the missing connectivity and hardware. In other words, the full propagation and impact of a configuration change across the entire network cannot be identified from the partial validation provided by the laboratory testing.

Unlike laboratory testing, canary testing can be done against the network devices of the actual network so as to account for the network or device state and the impact of a configuration change to these states. Canary testing involves testing the configuration change against a small subset of the actual network. If no errors are observed in that small subset, the configuration change is applied and validated against a larger subset of the network. In any canary testing stage, the validation is of limited scope, because some errors and outages resulting from a configuration change may be outside the subset of network devices under test or observation. Canary testing can therefore provide a false validation. Canary testing therefore cannot be used to holistically or comprehensively validate the network end state as canary testing necessarily requires segmenting the network for partial or sampled validation.

Accordingly, there is a need to holistically validate network configuration changes without impacting the current steady state of the network. The holistic validation should identify a modified end state of a network resulting from one or more changes to configurations of the hardware or physical network devices without modifying the running configurations on the network devices.

The only true means by which to achieve holistic validation of the network end state today is to apply the configuration changes directly to the actual network and to detect and correct the errors as they happen. Implementing changes without knowing the full scope of risk for outages, blackholes, lost traffic, etc. in the network is, however, unacceptable as such errors result in lost productivity, lost revenue, and interruption to content and services.

BRIEF DESCRIPTION OF THE DRAWINGS

A preferred embodiment for holistic validation of a network via native communication across a mirrored emulation of the network will now be described, by way of example only, with reference to the accompanying drawings in which.

DETAILED DESCRIPTION

I. Overview

Figure 1:
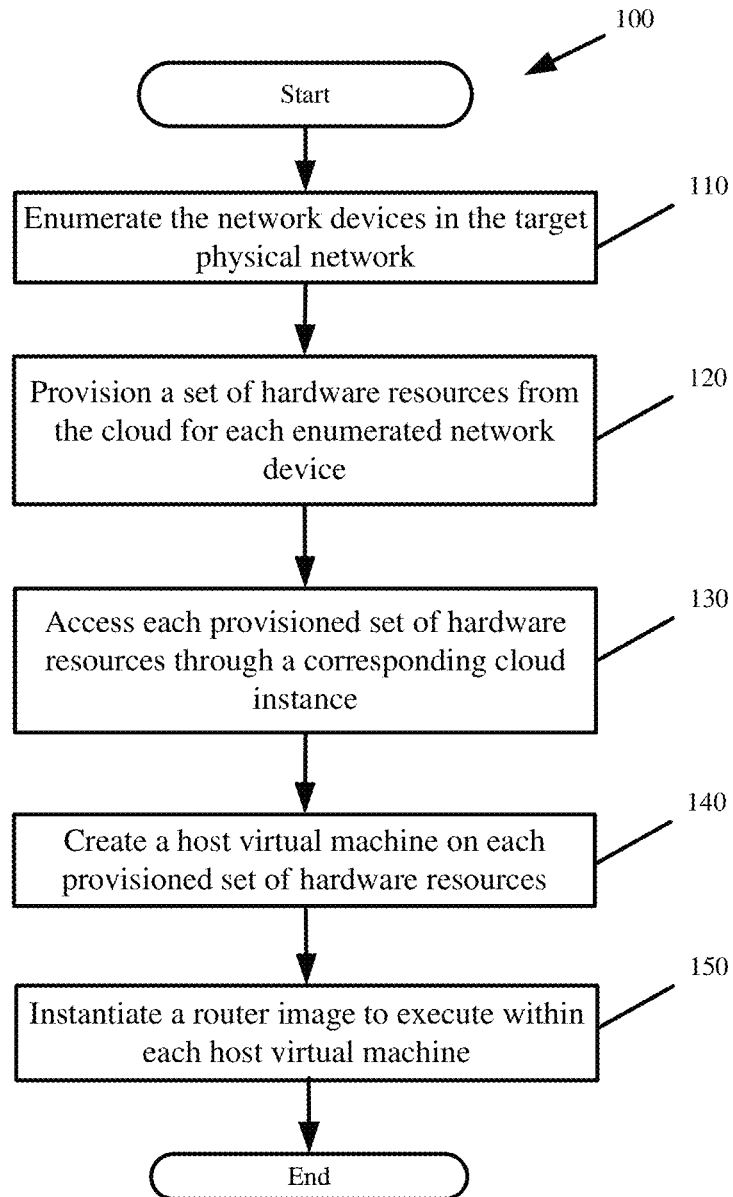
FIG. 1 presents a process for creating emulated network devices that mirror network devices of a target physical network in accordance with some embodiments.

Disclosed are embodiments for replicating a target physical network comprising a plurality of hardware network devices in the cloud. The replicated network comprises a distributed set of hardware resources (i.e., cloud machines). The distributed set of hardware resources execute emulated network devices that collectively recreate the functionality and operation of the hardware network devices of the target physical network. Some embodiments replicate the same topology and the same direct network connectivity that exists between the hardware network devices of the target physical network across the distributed set of hardware resources and the emulated network devices based on nested overlay networks. By mirroring the topology and direct connectivity that exists between the hardware network devices in the cloud, the replicated network is further able to mirror the native communication that occurs between the hardware network devices of the target physical network, wherein the native communication involves retaining layer 2 broadcast domains and layer 2 forwarding of frames between directly connected network devices. The replicated network mirrors the target physical network from the data link layer or layer 2 of the Open Systems Interconnection (OSI) model up to the higher layers.

Several challenges are overcome to achieve the disclosed embodiments for replicating different physical networks, direct connectivity, and native communication between hardware network devices of those networks in the cloud. A cloud service provider, such as Amazon Web Services or Google Compute Engine, provides distributed sets of hardware resources to different customers. These different sets of hardware resources can be reconfigured in virtually any manner desired by the customer for virtually any purpose. For the disclosed embodiments, the distributed sets of hardware resources are configured to emulate different hardware network devices of a target physical network including hardware routers, switches, load balancers, and firewalls as some examples. However, the cloud resources can be located in different server farms in different geographic regions. There is no control over which resources the cloud allocates or the specific location of the resources. This is especially true when replicating a target physical network using resources of two or more cloud service providers. As such, the set of hardware resources that are allocated from the cloud and that are used to run the emulated network devices will not have the direct connectivity that exists between the hardware network devices of the target physical network. This occurs even when the distributed sets of hardware resources for the replicated network are provisioned from a private cloud (e.g., OpenStack). Moreover, the emulated network devices are created on and execute within other virtual machines or cloud instances that control and provide access to the hardware resources of the cloud machines. Due to this encapsulated execution of the emulated network devices within the cloud instances, there is an additional networking or network interface layer that prevents the emulated network devices from having any direct connectivity with one another, let alone, direct connectivity that mirrors the connectivity that exists between the hardware network devices of the target physical network. To even communicate with one another, the emulated network devices send and receive packets through the ethernet interfaces of the corresponding cloud instances in which the emulated network devices execute. The ethernet interfaces of the cloud instances will have different addressing than the ethernet interfaces of the hardware network devices. The native communication occurring within the target physical network cannot be replicated because of the different addressing. The embodiments resolve these addressing, connectivity, and other issues in order to replicate the specific topology, direct connectivity, and native communication of different physical networks with arbitrary allocations of cloud resources and nested execution of emulated network devices within cloud instances.

By successfully replicating the topology, direct connectivity, and native communication of a target physical network in the cloud, some embodiments are then able to holistically and comprehensively validate configuration changes and their impact to the end state of the target physical network in the cloud without impacting the existing steady state of the target physical network. The validation allows network administrators to detect through the replicated network, the very same blackholes, loops, improper routing, improper traffic management, improper attack protections, and other errors that would manifest anywhere in the target physical network as a result of a changed configuration without introducing any such errors in the target physical network.

More specifically, changes to configurations of one or more hardware network devices of a target physical network are applied to the corresponding emulated network devices in the replicated network instead of the one or more hardware network devices. Because the emulated network devices have the same direct connectivity and native communications as the hardware network devices, the impact of the changes on the target physical network are exactly reproduced in the replicated network. This includes reproducing the exact end state that would occur in the target physical network as a result of the changes by reproducing the full cascading effect of the changes at each and every replicated connection and emulated network device of the replicated network without impacting the steady state of the physical network.

II. Network Replication

Replicating a target physical network involves, for each physical or hardware network device of the target physical network, instantiating and executing an emulated network device on a different set of hardware resources allocated from a different cloud machine. In some embodiments, the emulated network device executes a network device image. More specifically, when emulating a hardware router from the target physical network, the emulated network device executes a router image replicating the functionality and operation of that hardware router, and when emulating a hardware firewall appliance from the target physical network, the emulated network device executes a firewall image replicating the functionality and operation of that hardware firewall appliance. Accordingly, the network device image is the operating system and software that controls the operations of a hardware network device. For example, a router image is responsible for building the various addressing tables (e.g., Address Resolution Protocol (ARP) tables, Border Gateway Protocol (BGP) tables, Link Aggregation Control Protocol (LACP) tables, Open Shortest Path First (OSPF) tables, etc.), and for routing or forwarding packets, frames, and other data based on the one or more tables. In some embodiments, the network device image is embedded within a host virtual machine that enables execution of the networking operations on different hardware platforms. The virtual machine can virtualize the network device hardware such that the network device image executes on a Linux host machine or other set of hardware resources allocated from a cloud machine. In some embodiments, the emulated network device creates the host virtual machine in which the network device image executes.

Different network device manufacturers provide at least the network device image for the emulated network devices. A different network device image can be provided for each of the manufacturer's network device models. Alternatively, a manufacturer can provide a single network device image for emulating two or more different hardware network devices. For instance, the Arista Extensible Operating System (EOS) is a single network operating system image that runs and controls routing functionality across different Arista network routing hardware. The EOS can also be run in a virtual machine with the virtual machine virtualizing the various Arista network routing hardware to allow execution of the router image on other hardware or machines, including Linux systems. Certain manufacturers may not expose the network device images for their hardware network devices or may not have developed network device images that can run outside or apart from the underlying network device hardware. In such cases, a network device image of a different manufacturer providing similar functionality could be used, or a generic network device image providing basic network device functionality could be used for the emulated network devices.

FIG. 1 presents a process 100 for creating emulated network devices that mirror hardware network devices of a target physical network in accordance with some embodiments. Process 100 is performed by an orchestrator of some embodiments. The orchestrator is a special purposed network replicating machine. With respect to FIG. 1, the network replicating machine replicates the topology of the target physical network in the cloud by provisioning and instantiating the emulated network devices that emulate the hardware network devices of the target physical network. The network replicating machine has network connectivity to one or more cloud service providers on which the target physical network is to be replicated.

Process 100 commences with enumeration (at 110) of the hardware network devices in the target physical network. The enumerated listing can be provided by the administrator of the target physical network. Alternatively, some embodiments run a trace script (e.g., traceroute) to map the hardware network devices in the target physical network. In the most basic form, the enumerated listing provides a number and type (e.g., router, switch, load balancer, firewall, etc.) of all the network devices in the target physical network. Additional information such as the interface addressing, specific make and model, versioning (e.g., operating system, configuration, etc.), location, and connectivity can be provided with the enumeration or at a later time.

The process provisions (at 120) a set of hardware resources from public or private cloud machines of one or more cloud service providers for each enumerated hardware network device. This includes provisioning one or more processors or processing cycles, memory, one or more network interfaces, network bandwidth, storage, or combinations thereof. The provisioned sets of hardware resources can have the same quantity of resources for each enumerated hardware network device. Alternatively, different resource quantities can be provisioned for different hardware network devices based on versioning, make, or model to account for different functionality or hardware of the network devices. The provisioning of different sets of hardware resources from different cloud service providers can be based on criteria such as cost, performance, location, and availability as some examples.

The process remotely accesses (at 130) each provisioned set of hardware resources through a cloud instance that the cloud service provider instantiates for each provisioned set of hardware resources. The cloud instance is a first-tier virtual machine that provides second-tier virtual machines, instantiated and executing on the cloud instance, access to the set of hardware resources provisioned from the underlying cloud machine. The emulated network device is an example of one such second-tier virtual machine.

Each cloud instance has a network interface that is linked to the physical ethernet interface of the underlying computing machine from which the set of hardware resources are provisioned. Through this physical ethernet interface, the cloud instance can communicate with other cloud instances. The physical ethernet interface is also the means by which emulated network devices executing within the cloud instances communicate with one another. However, as noted above, this physical ethernet interface will have addressing that differs from the addressing for the physical ethernet interfaces of the hardware network devices from a target physical network that is to be replicated.

The process creates (at 140) a host virtual machine on each provisioned set of hardware resources, wherein the host virtual machine becomes a second-tier virtual machine encapsulated within the first-tier virtual machines. In some embodiments, the host virtual machine contains the system and application framework (e.g., operating system and other system software) upon which the network device image executes.

Next, the process instantiates (at 150) a network device image to execute within the system and application framework of each host virtual machine. Execution of the network device image within the host virtual machine produces an emulated network device that replicates layer 2 and above functionality of a hardware network device in the target physical network. As noted above, some network device images embed a host virtual machine with the network device operational software such that steps 130 and 140 can be combined as a single step.

It should be noted that steps 120-150 above can be performed in parallel for each emulated network device that is created when replicating a target physical network having many hardware network devices. The parallel creation of emulated network devices is supported by a single cloud service provider, but can be accelerated when creating the emulated network devices across multiple cloud service providers. This parallel creation of emulated network devices allows for rapid replication of a target physical network of any size or scale.

Figure 2:
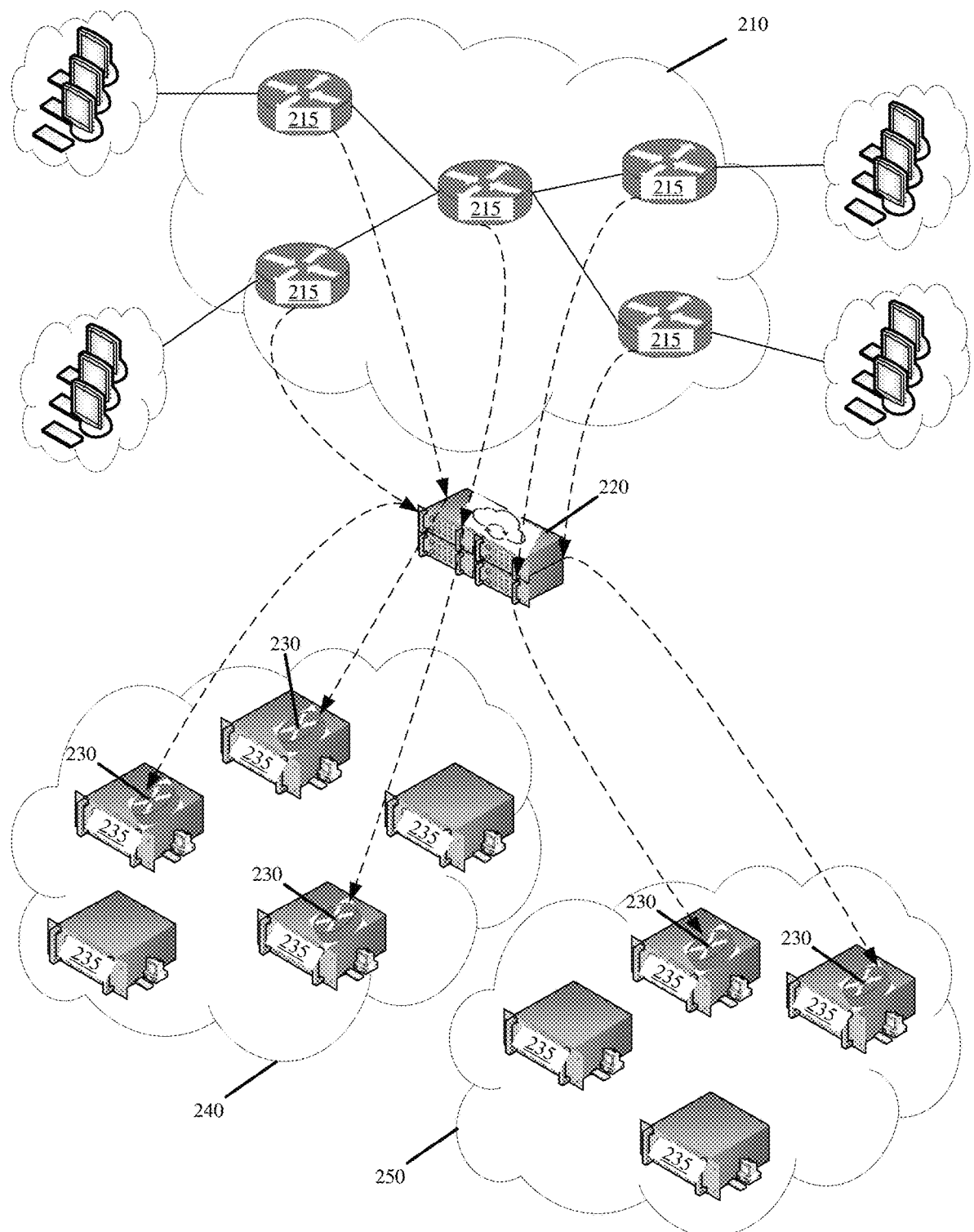
FIG. 2 conceptually illustrates the orchestrator creating different emulated network devices on arbitrary cloud instances to replicate hardware network devices of a target physical network in accordance with some embodiments.

FIG. 2 conceptually illustrates the orchestrator creating different emulated network devices on arbitrary cloud instances to replicate hardware network devices of a target physical network in accordance with some embodiments. As shown, the target physical network 210 is comprised of five hardware network devices 215. The orchestrator 220 maps the architecture and topology of the target physical network 210 in order to identify the five hardware network devices 215 that form the target physical network 210. The orchestrator then creates an emulated network device 230 within a different cloud instance provisioned on a different cloud machine 235 of two different cloud service providers 240 and 250 for each of the hardware network devices in the target physical network 210.

The next step in replicating the target physical network is to mirror the native communication that occurs between the hardware network devices of the target physical network on the instantiated emulated network devices of the replicated network. Such native communication is achieved by identifying the direct connections that exist between pairs of hardware network devices in the target physical network either through discovery or configuration, and by recreating those direct connections between pairs of emulated network devices emulating corresponding pairs of hardware network devices. In some embodiments, the direct connections between pairs of hardware network devices are determined from the Link Layer Discovery Protocol (LLDP) and/or one or more of the Address Resolution Protocol (ARP), Media Access Control (MAC), Link Aggregation Control Protocol (LCAP), and other addressing or routing tables of the hardware network devices. In some embodiments, the addressing or routing tables are provided by the administrator of the target physical network, are obtained from remotely accessing and inspecting the tables of the hardware network devices, or are rebuilt from sniffing packets flowing the target physical network.

Some embodiments reproduce the native communication and direct connectivity of the hardware network devices from the target physical network in the emulated network devices of the replicated network with nested overlay networks. A first overlay network provides a first set of direct logical connections between the cloud instances provisioned for the emulated network devices. Nested within the first set of direct logical connections is a second overlay network. The second overlay network is formed by creating virtual ethernet interfaces for the emulated network devices with addressing mirroring addressing of the hardware network device ethernet interfaces, and by leveraging the direct connectivity between the cloud instances provided by the first set of direct logical connections in order to form a different second set of direct logical connections between the virtualized ethernet interfaces of the emulated network devices, with the second set of direct logical connections mirroring the direct connectivity that exists between the hardware network devices in the target physical network.

Through the nested overlay networks, the same layer 2 frames, layer 3 packets, and other messaging that are sent and received by the network devices in the target physical network are sent and received without modification by the corresponding emulated network devices in the replicated network over the second set of direct logical connections. More specifically, first and second emulated network devices that are directly connected as a result of the nested overlay networks send and receive the same frames as first and second hardware network devices that are directly connected in the target physical network and that are emulated by the first and second emulated network devices. In some embodiments, this includes retaining the same addressing in the frames, packets, and other messaging that are exchanged in the target physical network for the frames, packets, and other messaging exchanged in the replicated network.

Figure 3:
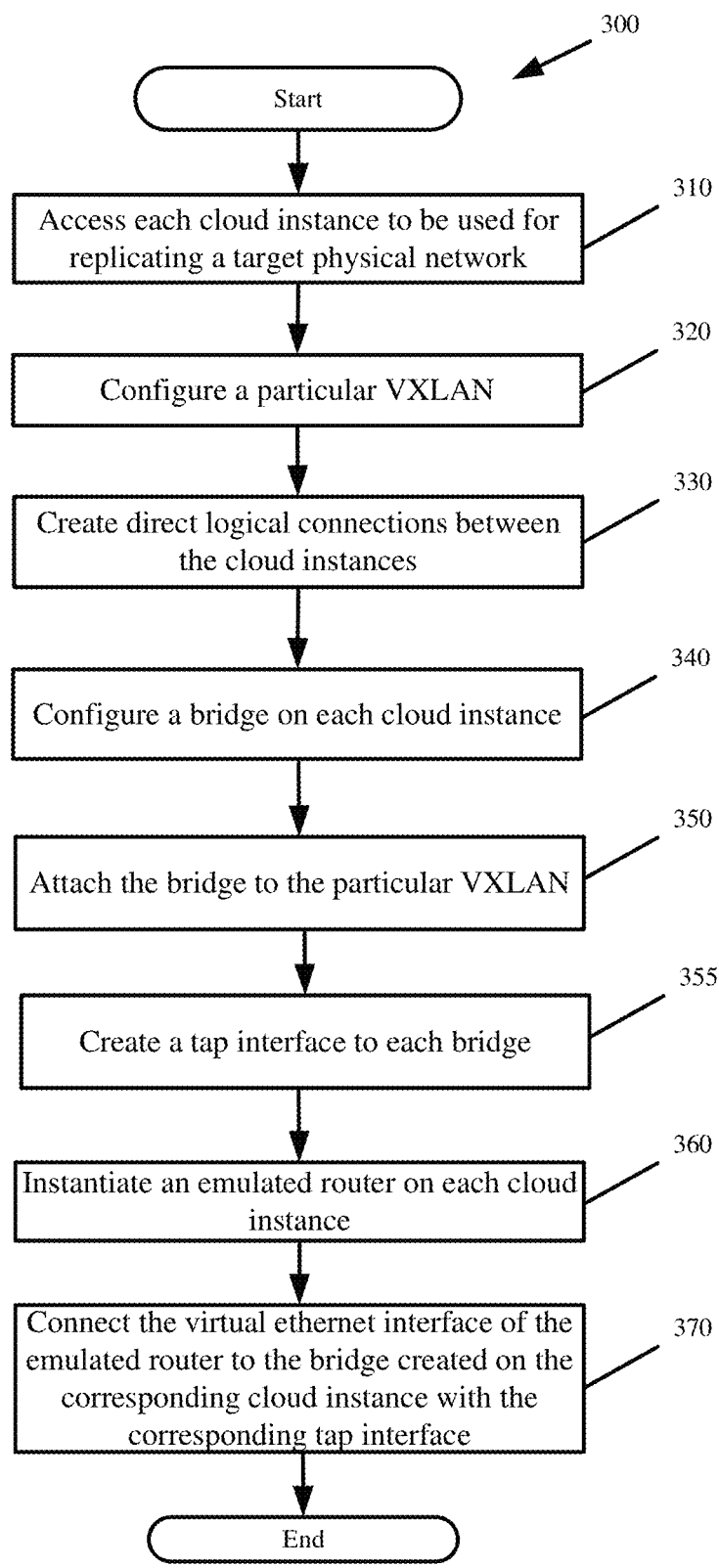
FIG. 3 presents a process for establishing the nested overlay networks in accordance with some embodiments.

FIG. 3 presents a process 300 for establishing the nested overlay networks in accordance with some embodiments. Process 300 is also performed by the orchestrator behind process 100 above. With respect to process 300, the network replicating machine of the orchestrator establishes, configures, and controls the nested overlay networks that reproduce the native communication and direct connectivity between the hardware network devices in the target physical network on the emulated network devices of the replicated network.

Figure 4:
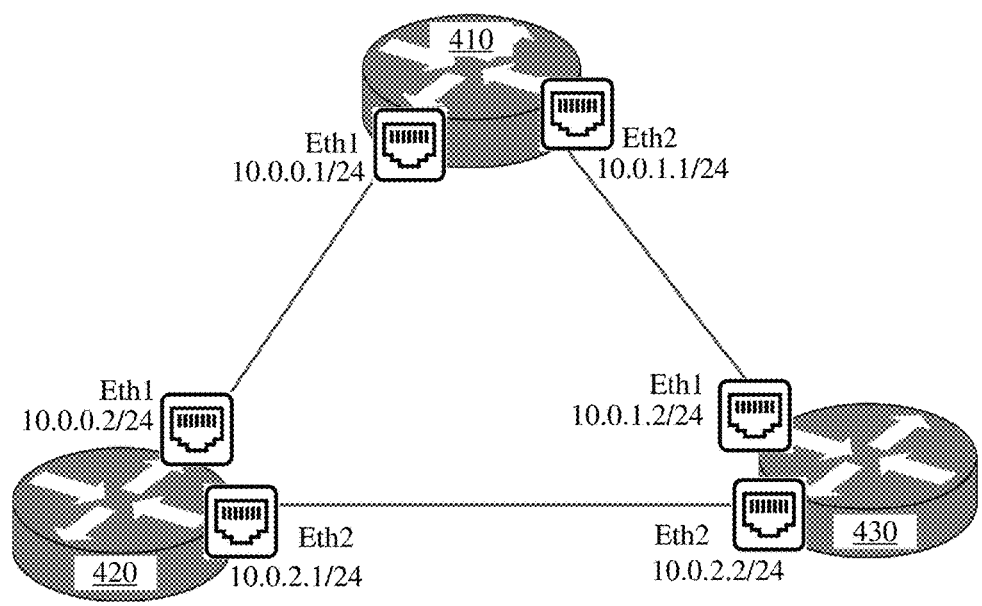
FIG. 4 conceptually illustrates a target physical network with three hardware network devices, the addressing for the various ethernet interfaces of the devices, and the direct connectivity between the devices that is subject to replication in the cloud in accordance with some embodiments.

The discussion of process 300 is keyed to the target physical network depicted in FIG. 4. Additional figures presented below visually demonstrate the various steps of process 300 for establishing the nested overlay networks.

FIG. 4 conceptually illustrates a target physical network with three hardware network devices 410, 420, and 430. FIG. 4 further illustrates the addressing for the various ethernet interfaces of the hardware network devices 410-430 and the direct connectivity between the hardware network devices 410-430.

Figure 5:
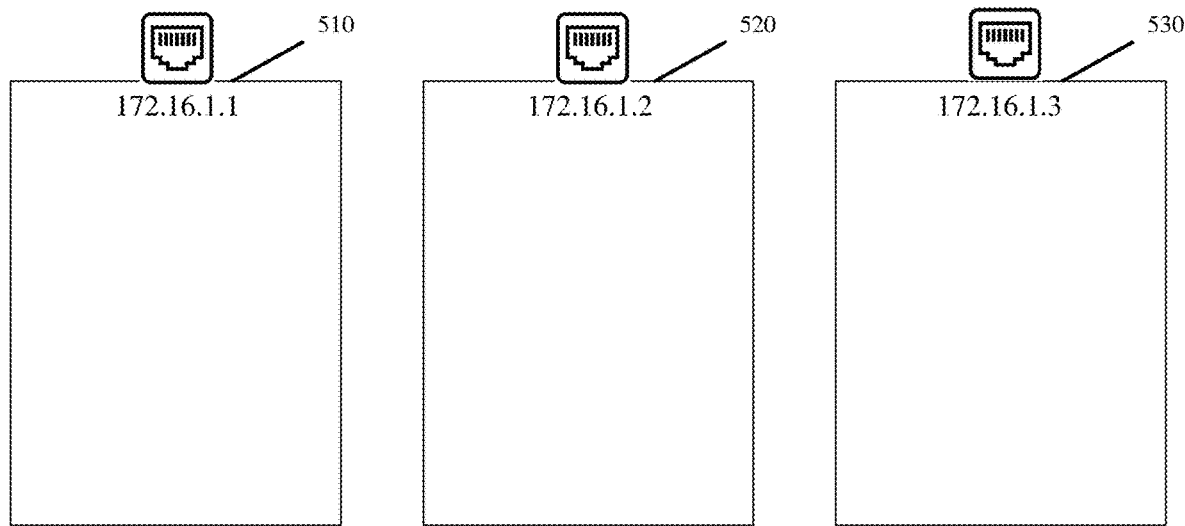
FIG. 5 conceptually illustrates three cloud instances on which the hardware network devices and target physical network of FIG. 4 are to be emulated.

FIG. 5 conceptually illustrates three cloud instances 510, 520, and 530 on which the hardware network devices 410-430 are to be emulated. Each cloud instance 510-530 is shown with a single ethernet interface and an address assigned to the ethernet interface. As can be seen, the addressing for the ethernet interfaces of the cloud instances 510-530 differs from the addressing of the ethernet interfaces of the hardware network devices 410-430. The cloud instances 510-530 can be created on any cloud machine (public or private) in any location. The cloud instances 510-530 need not, and likely do not, have the same direct connectivity as the hardware network devices 410-430 of the target physical network. More specifically, the cloud instances 510-530 are typically in different broadcast domains that are separated by at least one layer 3 routed network.

Process 300 commences by accessing (at 310) each of the cloud instances 510-530 to be used for replicating the target physical network of FIG. 4. Accessing the cloud instances 510-530 involves establishing a network connection to each cloud instance, providing access credentials (if necessary), and issuing commands for establishing a first overlay network to provide direct logical connectivity between the cloud instances 510-530.

To establish the first overlay network, the process first configures (at 320) a particular Virtual Extensible Local Area Network (VXLAN). In some embodiments, the orchestrator accesses each provisioned cloud instance via a digital network and secure access credentials, and issues a command, such as "ip link add vxlanXYZ type vxlan id [VXLAN_identifier] dstport 4789", to configure the particular VXLAN.

The process then places the cloud instances 510-530 on that same particular VXLAN. The particular VXLAN connects two or more layer 3 network domains to appear as a common layer 2 domain. By placing the cloud instances 510-530 on the same particular VXLAN, the cloud instances 510-530 will be able to communicate as if they were directly connected on the same layer 2 subnet. Layer 2 forwarding protocols pass layer 2 broadcasts and other frames along the particular VXLAN.

Placing the cloud instances 510-530 on the particular VXLAN involves creating (at 330) direct logical connections between the cloud instances 510-530. Each such direct logical connection terminates at the ethernet interface for accessing one of the cloud instances 510-530. These direct logical connections establish a layer 2 broadcast domain for the particular VXLAN.

Placing the cloud instances on the particular VXLAN further involves configuring (at 340) a bridge (e.g., "a bridge interface") on each cloud instance and attaching (at 350) the bridge to the particular VXLAN. Each bridge is assigned a unique address different than the addressing of the ethernet interfaces. By attaching the bridge to the particular VXLAN, frames for the particular VXLAN arriving on the physical ethernet interface of the underlying cloud machine pass to the bridge. Similarly, frames for the particular VXLAN issued through the bridge pass through the direct logical connections of the particular VXLAN over to the bridges of the other cloud instances connected to the particular VXLAN. As will be described below, second-tier virtual machines (i.e., emulated network devices) running within the cloud instances 510-530 can communicatively access the particular VXLAN by connecting to the bridge created on the corresponding cloud instance.

Figure 6:
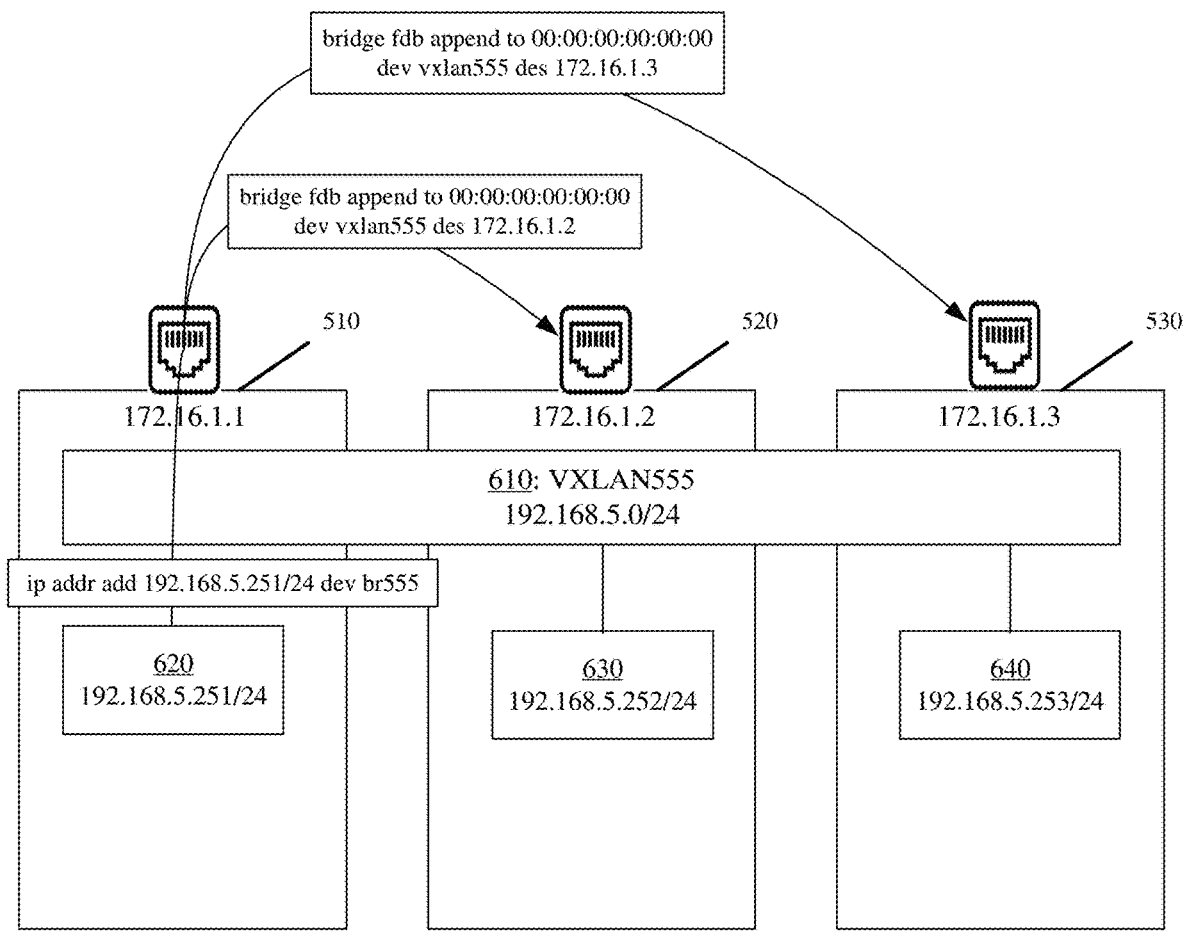
FIG. 6 conceptually illustrates creating direct logical connections between the different cloud instances of FIG. 5 based on bridges that connect the different cloud instances to a common VXLAN in accordance with some embodiments.

FIG. 6 conceptually illustrates creating direct logical connections between the different cloud instances 510-530 of FIG. 5 based on bridges 620, 630, and 640 that connect the different cloud instances 510-530 to a common VXLAN 610 in accordance with some embodiments. As shown in FIG. 6, the orchestrator configures the bridges 620-640 with the command "ip addr add [bridge_IPaddress] dev [bridge_identifier]". The orchestrator then creates direct logical connections between the cloud instances 510-530 through the VXLAN 610 using the configured bridge addressing. For instance, the orchestrator creates the direct logical connections with the command "bridge fdb append to 00:00:00:00:00:00 dev [VXLAN_identifier] dst [dest_ethintf_IPaddress]".

Figure 7:
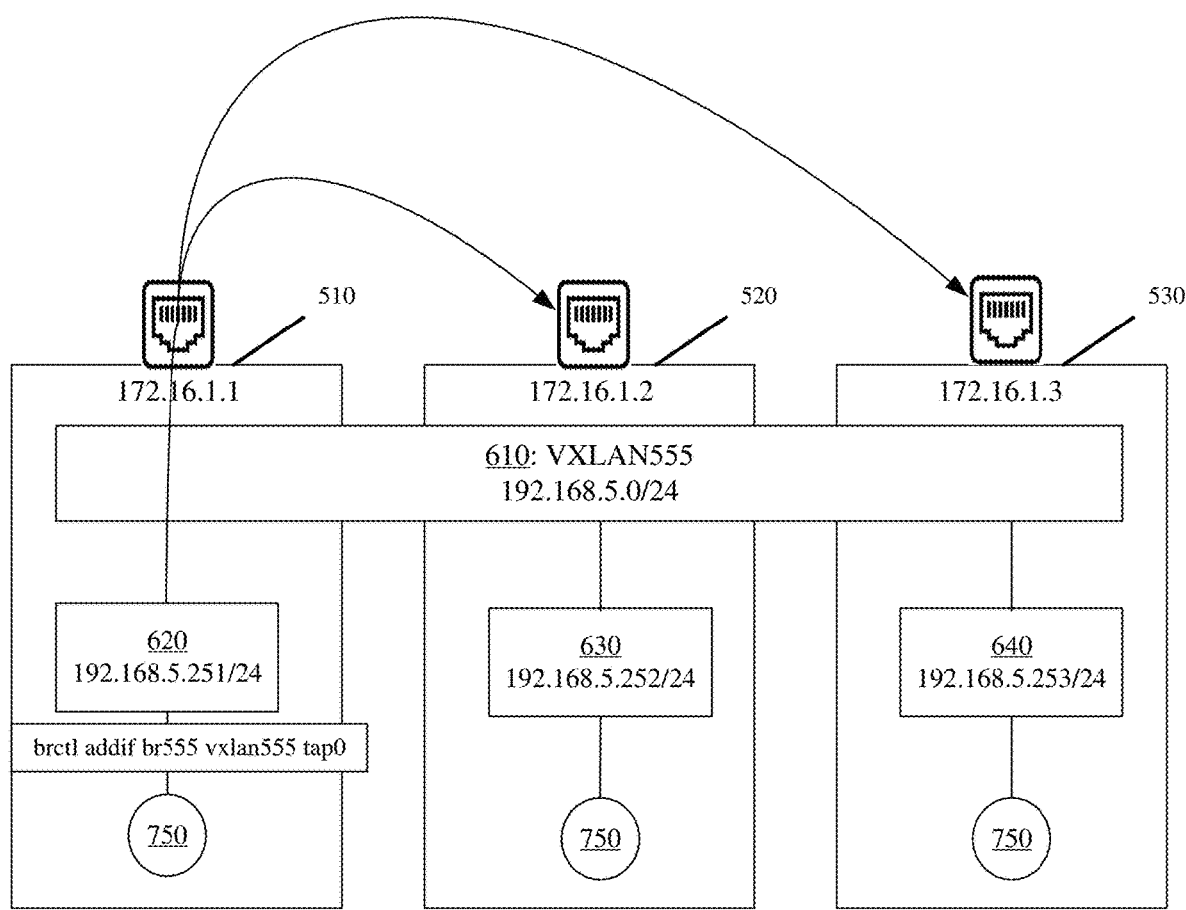
FIG. 7 conceptually illustrates creating the tap interfaces in accordance with some embodiments.

With reference back to process 300, the process creates (at 355) a tap interface to each bridge. The tap interface provides second-tier virtual machines access to the corresponding bridge on the same cloud instance. This access enables second-tier virtual machines to send and receive messaging through the particular VXLAN and the direct logical connections created between the cloud instances. FIG. 7 conceptually illustrates creating the tap interfaces 750 in accordance with some embodiments. In some embodiments, the orchestrator establishes the tap interfaces with the command "brctl addif [bridge_identifier] [VXLAN_identifier] [tap_name]".

The process instantiates (at 360) an emulated network device on each cloud instance. In some embodiments, instantiating the emulated network device comprises launching a host in which the network device image will execute, wherein the host is a second-tier virtual machine providing the system software or application software on which the network device image executes. As part of launching the host, the process creates a virtual ethernet interface for the host with an address in the same subnet as the bridge address.

The process then connects (at 370) the virtual ethernet interface of the host virtual machine for the emulated network device to the bridge created on the corresponding cloud instance using the corresponding tap interface. Connecting the emulated network device to the bridge provides the emulated network device with communicative access to the particular VXLAN, and more specifically, access to the layer 2 network created amongst the cloud instances by the first overlay network and the particular VXLAN.

Figure 8:
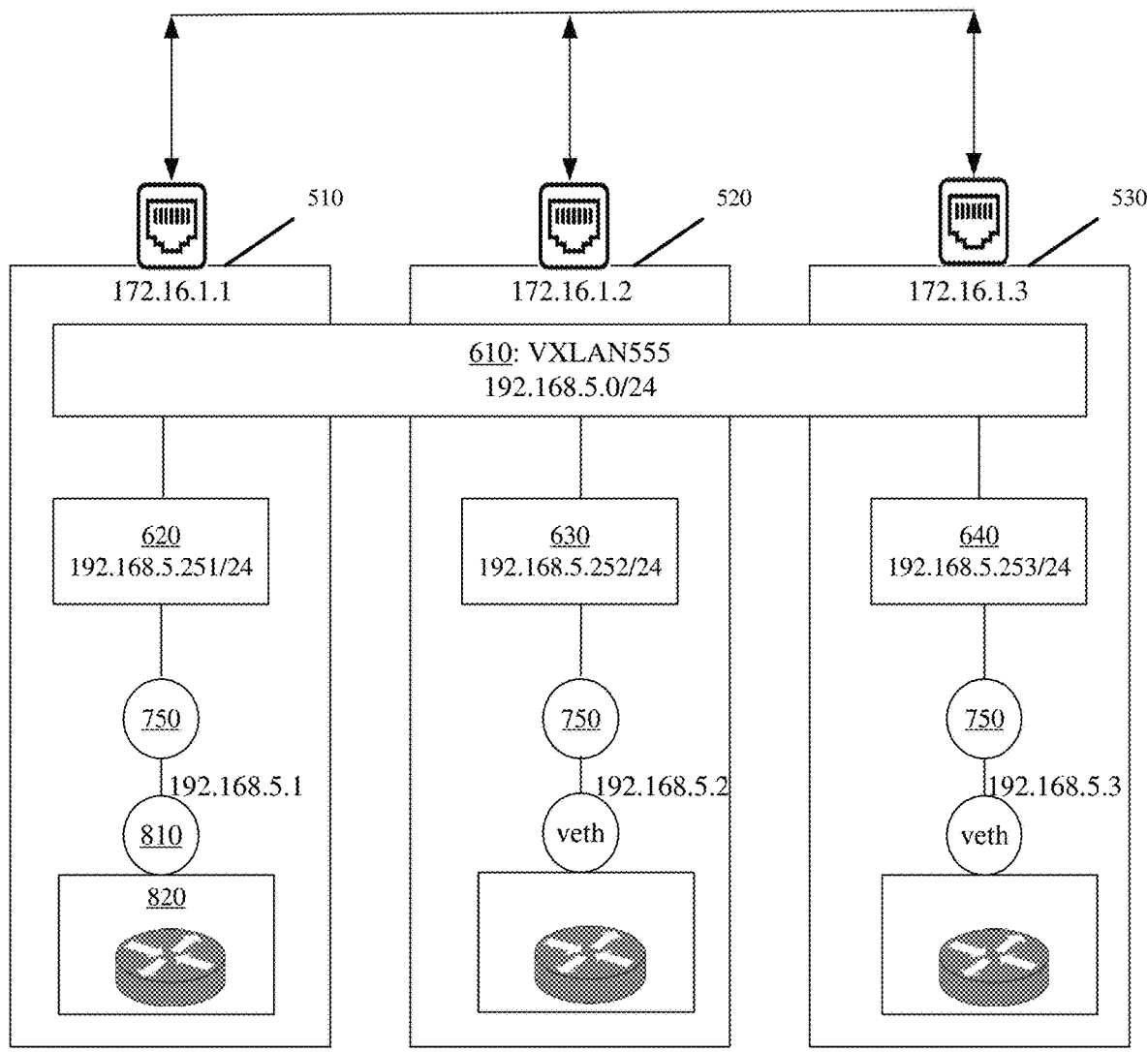
FIG. 8 conceptually illustrates connecting the virtual ethernet interface of the second-tier virtual machine for an instantiated emulated network device to the bridge 630 in accordance with some embodiments.

FIG. 8 conceptually illustrates connecting the virtual ethernet interface 810 of the second-tier virtual machine for an instantiated emulated network device 820 to the bridge 630 in accordance with some embodiments. The connection between the virtual ethernet interface 810 and the bridge 630 is made through the tap interface 750 to the bridge 630. The emulated network device 820 now has communicative access to the particular VXLAN 610.

The first overlay network described with reference to FIGS. 3-8 provides direct logical connectivity between the cloud instances provisioned from one or more cloud services providers and even the second-tier virtual machines for the emulated network devices. The cloud instances as well as the ethernet interfaces of the second-tier virtual machines are however assigned addressing that differs from the hardware network devices of the target physical network to be replicated. Accordingly, in order for the emulated network devices to communicate with one another, their frames, packets, and messaging traverse the first layer of different interfaces and addressing of the cloud instances and the second layer of different interfaces and addressing of the second-tier virtual machines. These additional layers separating the emulated network devices modify the frames that are sent and received by the emulated network devices.

In order to replicate the direct connectivity and native communications of the hardware network devices of the target physical network with the emulated network devices, some embodiments nest a second overly network within the first overlay network. The second overlay network removes the interface and addressing layer of the cloud instances and other intervening layers (i.e., second-tier virtual machines) between the emulated network devices. The second overlay network further serves to recreate the direct connections, addressing, and native communications that exists between the hardware network devices of the target physical network on the emulated network devices created on the cloud instances.

Figure 9:
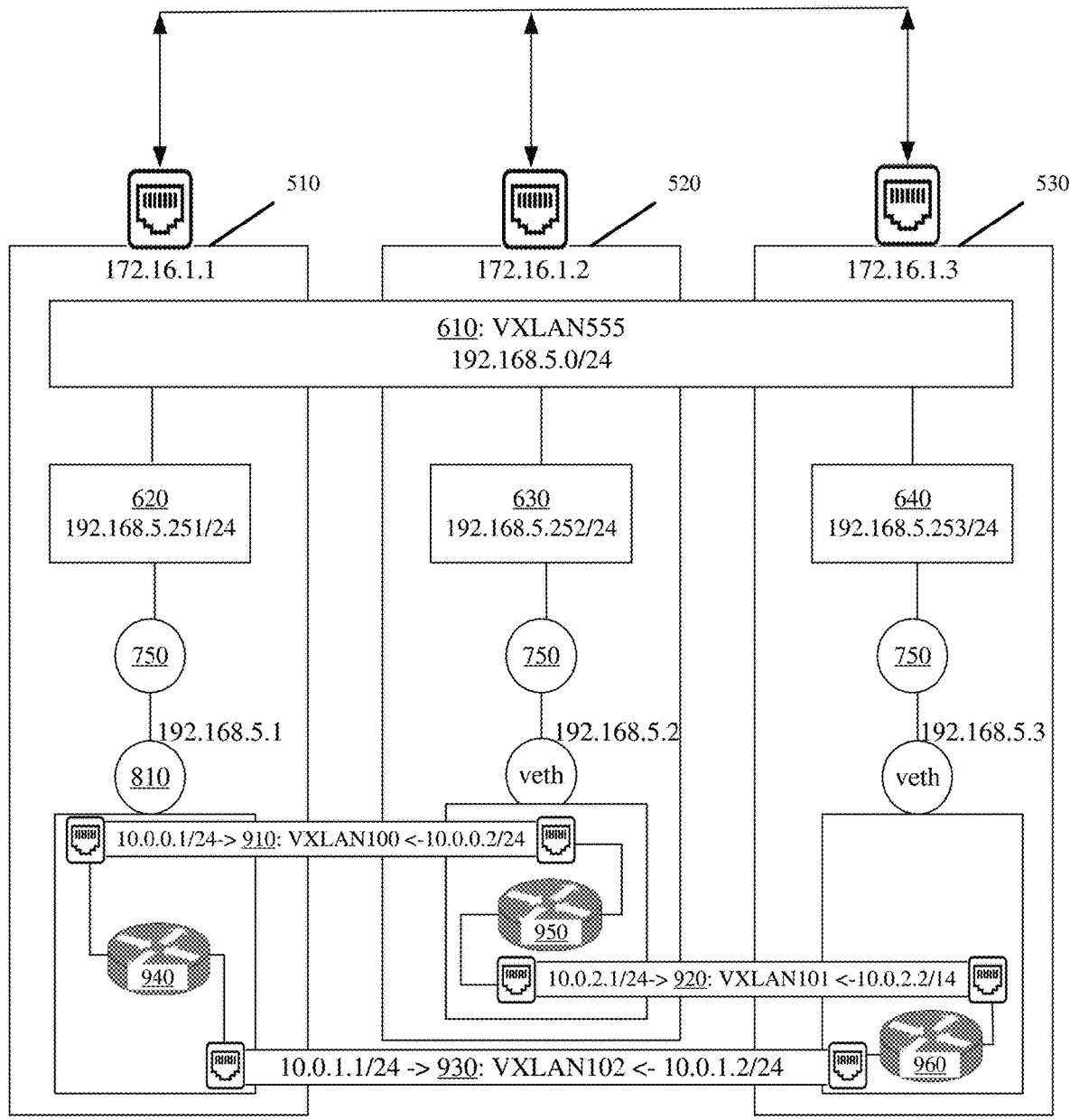
FIG. 9 conceptually illustrates creating the set of secondary VXLANs of the second overlay network within the particular VXLAN of the first overlay network in accordance with some embodiments.

In some embodiments, the second overlay network is a set of secondary VXLANs that are nested within the particular VXLAN of the first overlay network. FIG. 9 conceptually illustrates creating the set of secondary VXLANs of the second overlay network within the particular VXLAN of the first overlay network in accordance with some embodiments.

As shown in FIG. 9, the set of secondary VXLANs comprise three VXLANs 910, 920, and 930 that create direct logical connections between the emulated network devices 940, 950, and 960 that mirror the direct connections between the corresponding hardware network devices of the target physical network illustrated in FIG. 4 above. In particular, a first VXLAN 910 with a first VXLAN identifier is created between a first virtual ethernet interface of a network device image running on the first emulated network device 940 and a first virtual ethernet interface of a network device image running on the second emulated network device 950 in order to replicate the direct connection between hardware network devices 410 and 420 in FIG. 4, a second VXLAN 920 with a second VXLAN identifier is created between a second virtual ethernet interface of the network device image running on the second emulated network device 950 and a second virtual ethernet interface of a network device image running on the third emulated network device 960 in order to replicate the direct connection between hardware network devices 420 and 430 in FIG. 4, and a third VXLAN 930 with a third VXLAN identifier is created between a second virtual ethernet interface of a network device image running on the first emulated network device 940 and a first virtual ethernet interface of the network device image running on the third emulated network device 960 in order to replicate the direct connection between hardware network devices 410 and 430 in FIG. 4.

The set of secondary VXLANs establishes the direct logical connectivity between the emulated network devices that mirrors the direct connectivity between the hardware network devices of the target physical network. This places the emulated network devices on layer 2 broadcast domains that mirror the broadcast domains within the target physical network.

As further shown in FIG. 9, the virtual ethernet interfaces created on the network device images are assigned identical addressing to the ethernet interfaces of the hardware network devices in the target physical network of FIG. 4. This replication of the connectivity as well as the addressing allows the emulated network devices to mirror the native communication that occurs between the hardware network devices of the target physical network. In particular, the very same frames exchanged between the hardware network devices, with the very same addressing, are exchanged between the emulated network devices.

Figure 10:
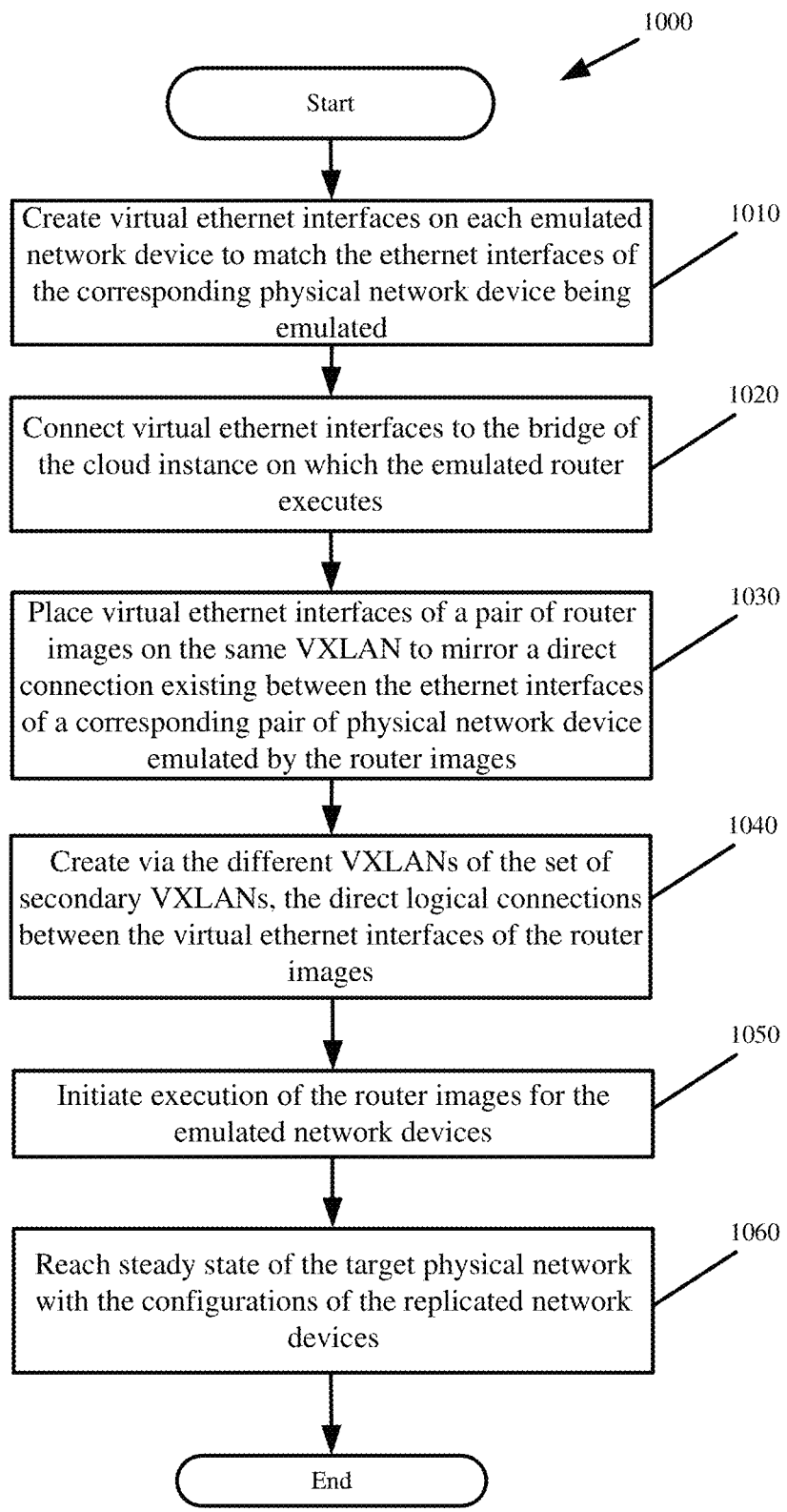
FIG. 10 presents a process for creating the set of secondary VXLANs for the second overlay network in accordance with some embodiments.

FIG. 10 presents a process 1000 for creating the set of secondary VXLANs for the second overlay network in accordance with some embodiments. Process 1000 is performed by the orchestrator in response to instantiating the emulated network devices on the cloud instances.

Process 1000 commences by creating (at 1010) one or more virtual ethernet interfaces on the network device image of each particular emulated network device to mirror the one or more ethernet interfaces of the corresponding hardware network device of the target physical network that is emulated by that particular emulated network device. As noted above, each virtual ethernet interface can be created with the same addressing as the corresponding ethernet interface of the hardware network device from the target physical network that is being emulated. FIG. 9 illustrates the virtual ethernet interfaces having the same addressing as the ethernet interfaces for the network devices in the target physical network of FIG. 4.

The process connects (at 1020) the virtual ethernet interfaces to the bridge of the cloud instance on which the emulated network device executes via the corresponding tap interface. This completes the bridge such that frames, packets, and other data communications exiting the virtual ethernet interface of the emulated network device pass through the ethernet interface of the cloud instance and exit out the particular VXLAN of the first overlay network using layer 2 forwarding protocols without requiring any changes to the addressing of the packets.

The process then creates the set of secondary VXLANs between the virtual ethernet interfaces of the network device images to reproduce on the emulated network devices, the direct connectivity existing between the corresponding ethernet interfaces of the hardware network devices in the target physical network. To do so, the process places (at 1030) the virtual ethernet interfaces of a pair of network device images on the same VXLAN to mirror a direct connection existing in the target physical network between the ethernet interfaces of a pair of hardware network devices emulated by the emulated network devices on which the pair of network device images execute. One such VXLAN is created for each direct connection that exists in the target physical network. These VXLANs form the set of secondary VXLANs of the second overlay network.

The process then creates (at 1040) via the different VXLANs of the set of secondary VXLANs, the direct logical connections between the virtual ethernet interfaces of the network device images using the same exact addressing as found for the direct connections between the corresponding hardware network devices of the target physical network. In particular, the destination address for the endpoint of each VXLAN of the set of secondary VXLANs is set, wherein the destination address is the address configured for the virtual ethernet interface of each network device image at which the direct logical connection terminates. The creation of the direct logical connections between the virtual ethernet images for the network device images of the emulated network devices is similar to the creation of the direct logical connections between the cloud instances described above with reference to FIG. 6.

The process initiates (at 1050) execution of the network device images for the emulated network devices. Initiating execution causes the emulated network devices to exchange addressing information with other emulated network devices that are directly connected based on the set of secondary VXLANs. After some duration, the process reaches (at 1060) the steady state of the target physical network with the replicated network, and more specifically, with the configurations of the emulated network devices, wherein upon reaching the steady state, the configurations of the emulated network devices recreate the various addressing and routing tables present in the corresponding hardware network devices of the target physical network.

Upon reaching the steady state, the emulated network devices, and more specifically, the network device images of the emulated network devices have the same connectivity, addressing, and native communications as the hardware network devices in the target physical network. In other words, the very same frames, packets, and other data communications sent from a source emulated network device through a bridge and over the particular VXLAN of the first overlay network arrive at a destination emulated network device with a direct logical connection to the source emulated network device based on one of the set of secondary VXLANs. The replicated network can therefore mirror the layer 2 broadcasts, addressing/connectivity information, and packet forwarding that occur between the hardware network devices of the target physical network.

In the embodiments above, the network device images are container based. A container-based network device image provides full access to the network device core functionality and configuration. Accordingly, the host virtual machine (i.e., second-tier virtual machine) can be used to directly configure the network device image and create the virtual ethernet interfaces and VXLANs as needed.

Some other embodiments allow network replication with hypervisor-based network device images. In some such embodiments, the network device image is provided as a closed binary. The closed binary prevents the orchestrator from creating the virtual ethernet interfaces and the VXLANs on the network device image. In such cases, the orchestrator defaults to configuring a set of Virtual Local Area Networks (VLANs) on the virtual ethernet interface provided by the closed binary. Each VLAN emulates a direct connection between two network devices albeit on the same ethernet interface.

Figure 11:
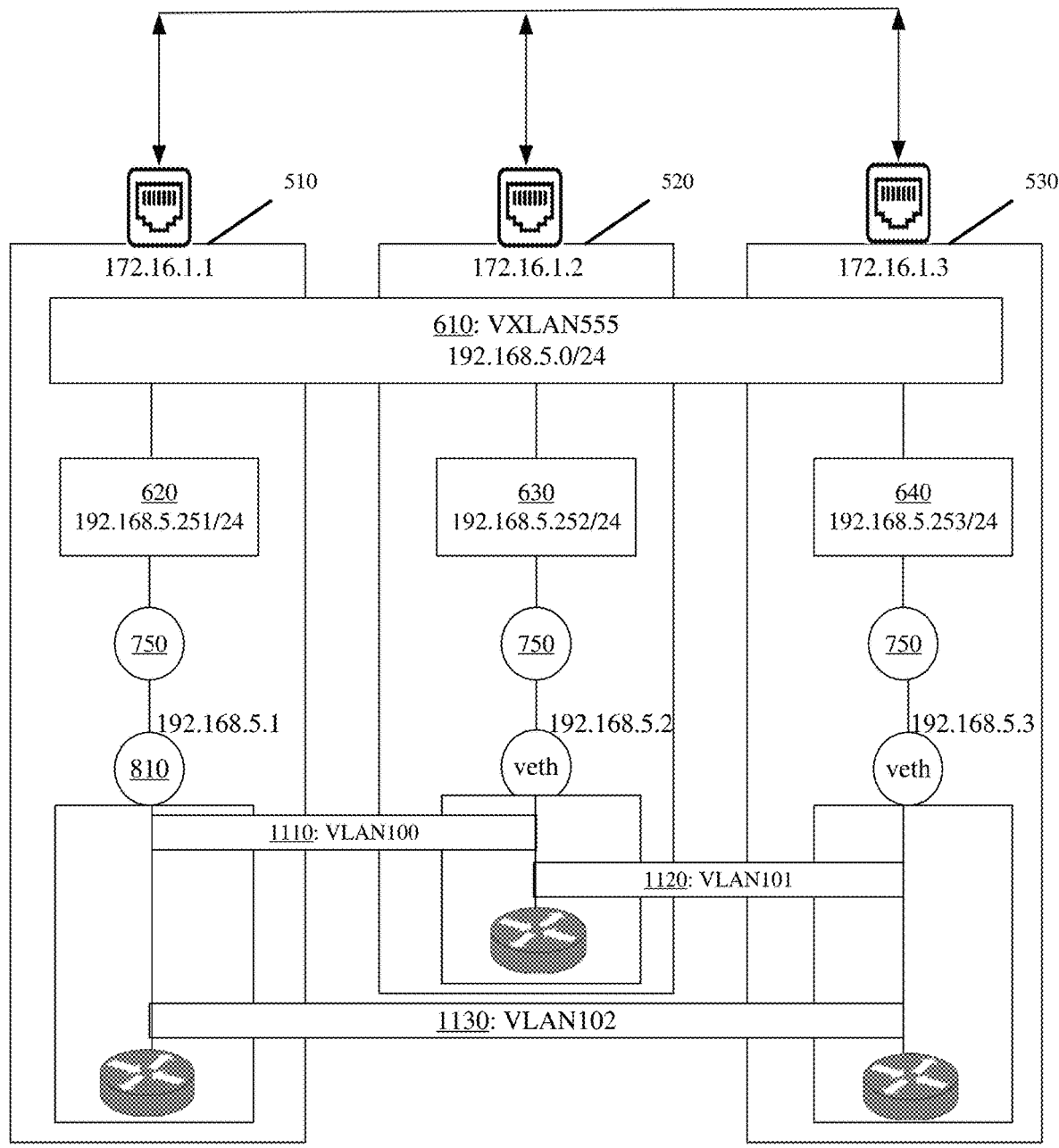
FIG. 11 conceptually illustrates nesting a second overlay network comprised of a set of VLANs in the first overlay network comprised of a VXLAN in accordance with some embodiments.

FIG. 11 conceptually illustrates nesting a second overlay network comprised of a set of VLANs in the first overlay network comprised of a VXLAN in accordance with some embodiments. In FIG. 11, a single ethernet interface of each network device image is configured so that packets tagged with different VLAN identifiers 1110, 1120, and 1130 are forwarded through different direct logical connections to different emulated network devices.

In some such embodiments, the native communication between network devices of the target physical network is somewhat altered by introducing the VLAN tags in the packets exchanged between the network device instances. The nested overlay networks otherwise fully replicate the target physical network with the introduction of the VLAN tags having no effect on validating changes to the network device configurations.

The embodiments above provide a replicated network that mirrors a target physical network via a three-layer nested virtualization. For instance, the cloud instance may be a first-tier virtual machine, the host virtual machine may be a second-tier virtual machine that runs within the first-tier virtual machine of the cloud instance, and the network device image for the emulated network device may run within a third-tier virtual machine that runs within the second-tier virtual machine of the host virtual machine.

Some embodiments provide a replicated network that mirrors a target physical network via a two-layer nested virtualization. The two-layer nested virtualization may eliminate the host virtual machine such that the emulated network device runs as a second-tier virtual machine directly within the first-tier virtual machine of the cloud instance. The two-layer nested virtualization may improve performance of the replicated network by reducing the virtualization overhead and/or by reducing resource usage on the cloud instances. The two-layer nested virtualized network may provide these benefits while still replicating the direct connectivity and native communication between hardware network devices of a target physical networks via the emulated network devices running directly within the cloud instance virtual machines.

As with the three-layer nested virtualization, the two-layer nested virtualization includes provisioning a set of hardware resources from public or private cloud machines of one or more cloud service providers for each hardware network device in a target physical network. The two-layer nested virtualization also includes creating a first-tier virtual machine or cloud instance on each provisioned set of hardware resources. In some embodiments, two or more first-tier virtual machines or cloud instances may be created on the same physical cloud machine. In some such embodiments, two or more network hardware devices from the target physical network can be replicated and emulated from the same physical cloud machine.

Similar to the procedure shown in FIG. 6, the two-layer nested virtualization further includes configuring a first-tier VXLAN on each cloud instance, and creating one or more forwarding entries (e.g., forwarding database entries) on each cloud instance to link the cloud instances together via the first-tier VXLAN, and to form a common a layer 2 broadcast domain across the different cloud instances that are part of the replicated network. The two-layer nested virtualization may also include creating a bridge with its own unique address on each cloud instance, and connecting each bridge to the first-tier VXLAN. The bridges may provide the second-tier virtual machines running within the cloud instances with access to the first-tier VXLAN. This, in turn, provides each emulated network device with access to the emulated network devices running within the other cloud instances that are also connected to the first-tier VXLAN.

The two-layer nested virtualization, like the three-layer nested virtualization described with reference to the figures above, then involves creating the direct logical connections that mirror the physical links between the hardware network devices of the target physical network. However, the creation of the direct logical connections for the two-layer nested virtualization differs from the creation of the direct logical connections for the three-layer nested virtualization because of the one less layer of virtualization.

In some embodiments, creating the direct logical connections for the two-layer nested virtualization may include creating a second-tier of bridges. The second-tier of bridges may be connected to the virtual network interfaces of the emulated network devices, with each virtual network interface emulating a different endpoint of a physical link in the target physical network. Creating the direct logical connections may then include creating a second set of VXLANs to connect the second-tier of bridges so that the second-tier bridge endpoints for the second set of VXLANs mirror the endpoints for the physical links between the hardware network devices of the target physical network.

Figure 12:
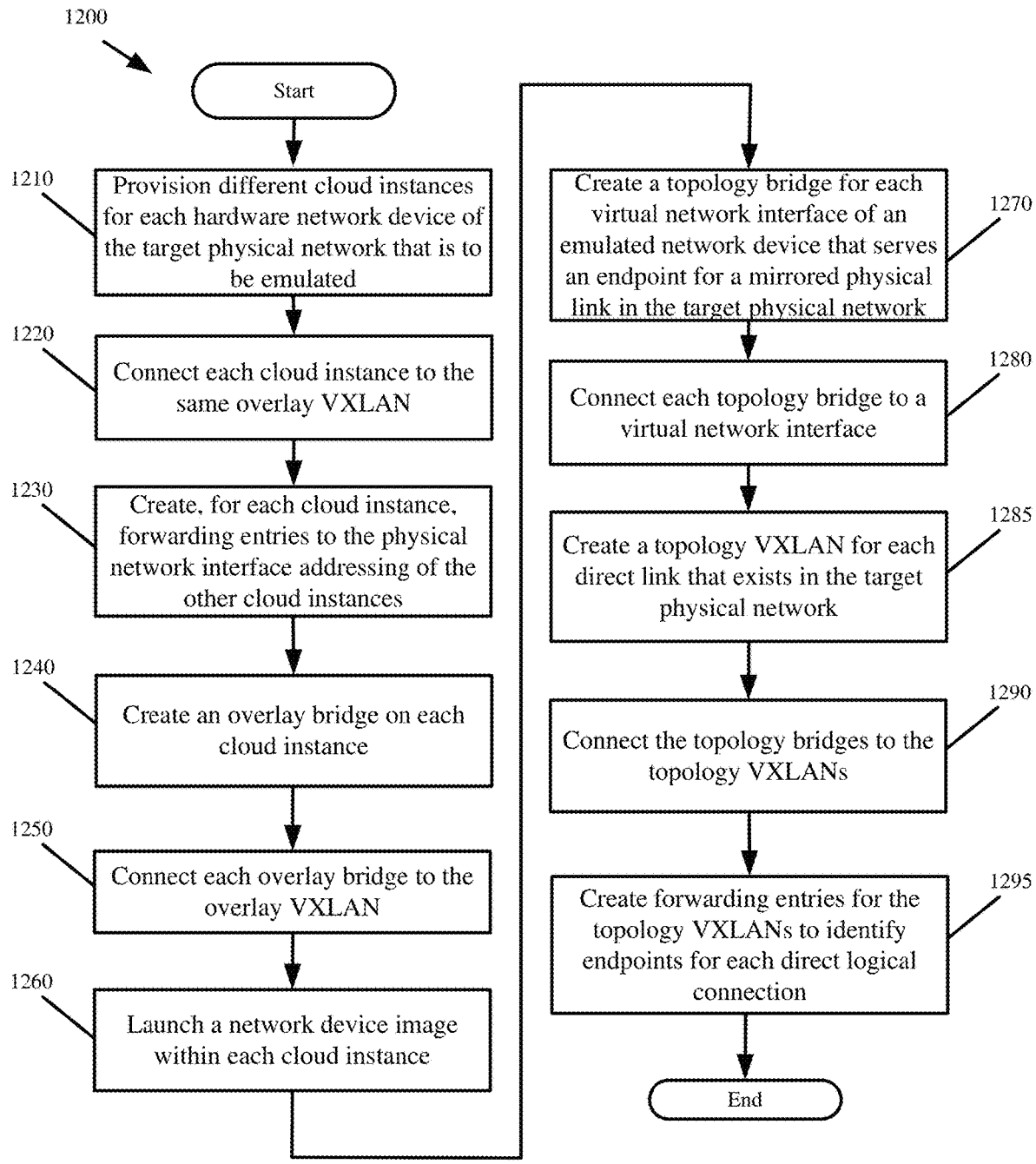
FIG. 12 presents a process for creating a two-layer nested virtualized network that replicates the direct connectivity and native communications of a target of physical network across different cloud instances in accordance with some embodiments.

FIG. 12 presents a process 1200 for creating a two-layer nested virtualized network that replicates the direct connectivity and native communications of a target of physical network across different cloud instances in accordance with some embodiments. Process 1200 may be performed in an entirely automated fashion by the orchestrator. For instance, the orchestrator may control and execute each of the operation of process 1200 without human interaction.

Process 1200 may include provisioning (at 1210) different cloud instances for each hardware network device of the target physical network that is to be emulated. Each provisioned cloud instance may represent a first-tier virtual machine. The first-tier virtual machine may be remotely accessed via a network address that is assigned to the physical network interface of the cloud hosted machine or device running that cloud instance. As noted above, two or more of the cloud instances may be provisioned from the same or different physical machines of one or more cloud service providers.

The process may connect (at 1220) each cloud instance of a particular replicated network to the same first-tier VXLAN. For instance, the orchestrator may execute example command "ip link add vxlanXYZ type vxlan id XYZ destport 4789" on each cloud instance to create and connect the cloud instance to the first-tier VXLAN identified by VXLAN identifier "XYZ".

The process may then create a layer 2 broadcast domain between the cloud instances. In particular, the process may create (at 1230), for each cloud instance, forwarding entries for the first-tier VXLAN that route frames, packets, messages, and/or other data to the physical network interface addressing of the other cloud instances. For instance, the orchestrator may execute example commands "bridge fdb append 00:00:00:00:00:00 dev vxlanXYZ dst 172.16.1.2" and "bridge fdb append 00:00:00:00:00:00 dev vxlanXYZ dst 172.16.1.3" on a particular cloud instance to cause the particular cloud instance to route outgoing frames, packets, messages, and/or other data with a broadcast Media Access Control (MAC) address (e.g., 00:00:00:00:00:00) to addresses 172.16.1.2 and 172.16.1.3 that may correspond to other cloud instances or first-tier virtual machines on the same replicated network. Example command "ip link set dev vxlanXYZ up" may be used to activate the first-tier VXLAN on each of the cloud instances.

The process may create (at 1240) a first-tier bridge on each cloud instance, and may connect (at 1250) each first-tier bridge to the first-tier VXLAN. The first-tier bridge therefore becomes a destination on each cloud instance for incoming data received over the first-tier VXLAN. For instance, the orchestrator may execute example command "ip addr add 192.168.5.251/24 dev br555" on a particular cloud instance to create a first-tier bridge with address 192.168.5.251/24 on the particular cloud instance. In some embodiments, each first-tier bridge may be assigned two or more Internet Protocol (IP) addresses or two or more different sets of IP addresses (e.g., address subnets).

The process may then include launching (at 1260) an emulated network device within each cloud instance. In some embodiments, each emulated network device may include a network device image that is part of a container or a virtual machine. The container may be a lightweight, standalone, executable package of software that includes everything needed to run an application, wherein the application for some embodiments may be the network device image that emulates the functionality of one or more of the hardware network devices from the target physical network. Launching the emulated network device may include installing, configuring, and/or otherwise instantiating the container, virtual machine, and/or network device image on a cloud instance. The emulated network device may provide one or more virtual network interfaces when deployed as part of a container. In some embodiments, launching the emulated network device may include configurating the virtual network interfaces with addressing to match the physical network interfaces of a corresponding hardware network device being emulated by the emulated network device.

Figure 13:
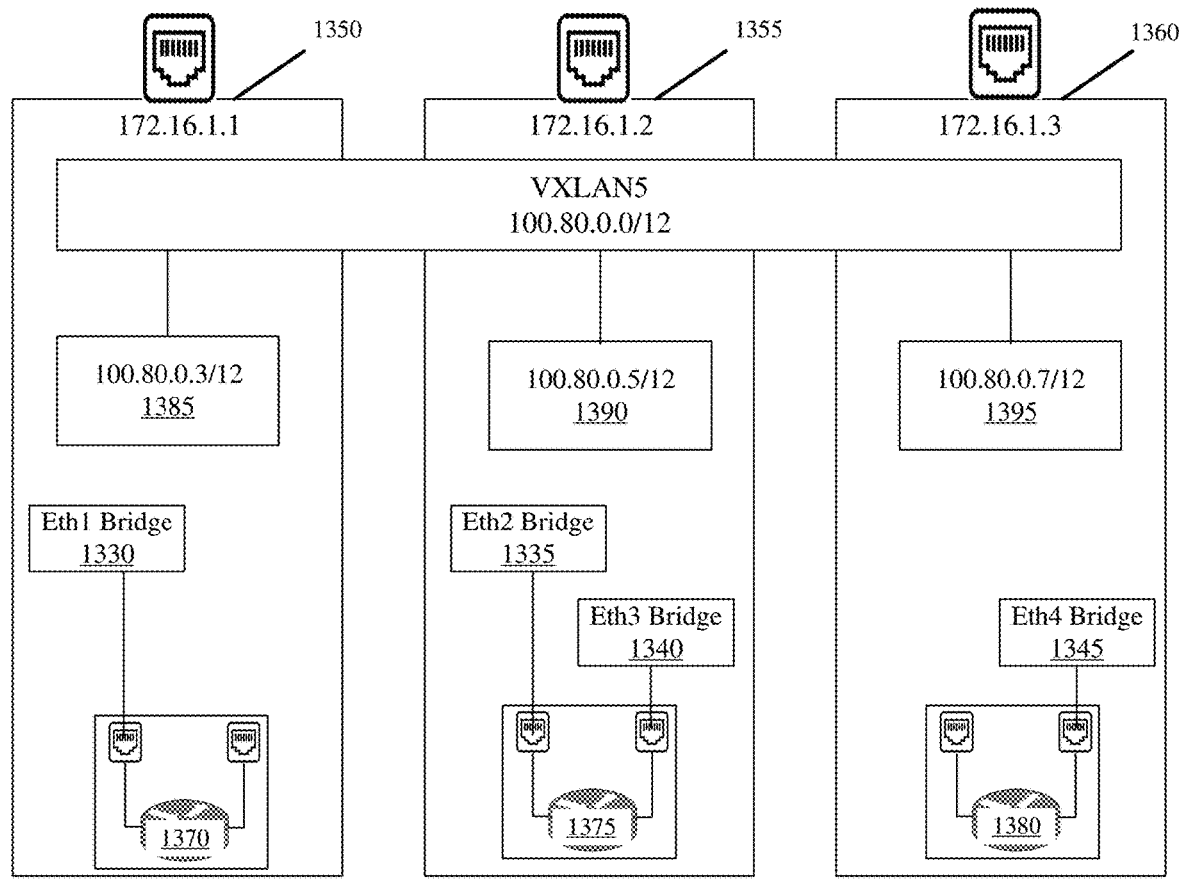
FIG. 13 conceptually illustrates creating endpoints in a replicated network that mirror endpoints for physical links between hardware network devices in a target physical network in accordance with some embodiments.
Figure 13:
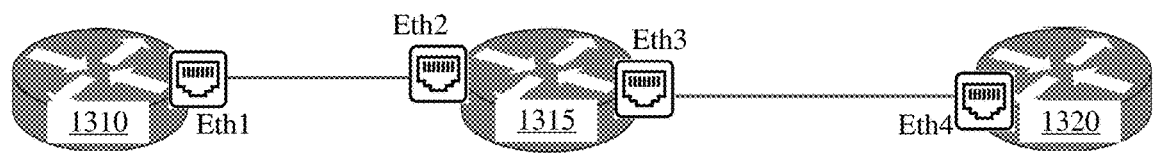

The process creates (at 1270) a second-tier bridge for each virtual network interface of an emulated network device that serves an endpoint for a mirrored physical link in the target physical network, and connects (at 1280) each second-tier bridge to a corresponding virtual network interface. FIG. 13 conceptually illustrates creating endpoints in a replicated network that mirror endpoints for physical links between hardware network devices 1310, 1315, and 1320 in a target physical network in accordance with some embodiments. For instance, FIG. 13 illustrates creating second-tier bridges 1330, 1335, 1340, and 1345 on cloud instances 1350, 1355, and 1360. FIG. 13 further illustrates connecting each second-tier bridge 1330, 1335, 1340, and 1345 to a different virtual network interface of emulated network devices 1370, 1375, and 1380, thereby establishing the mirrored endpoints in the replicated network for the physical links between hardware network devices 1310, 1315, and 1320 in the target physical network. In particular, notice that cloud instance 1355 has two second-tier bridges 1335 and 1340. A first second-tier bridge 1335 connects to a first virtual network interface of emulated network device 1375 that replicates an endpoint for a first direct link to hardware network device 1315 from hardware network device 1310. A second second-tier bridge 1340 connects to a second virtual network interface of emulated network device 1375 that replicates an endpoint for a second direct link to hardware network device 1315 from hardware network device 1320.

As further shown in FIG. 13, each cloud instance 1350, 1355, and 1360 is also configured with a first-tier bridge (e.g., first-tier bridge 1385 on cloud instance 1350, first-tier bridge 1390 on cloud instance 1355, and first-tier bridge 1395 on cloud instance 1360) that is connected to a first-tier VXLAN.

Figure 14:
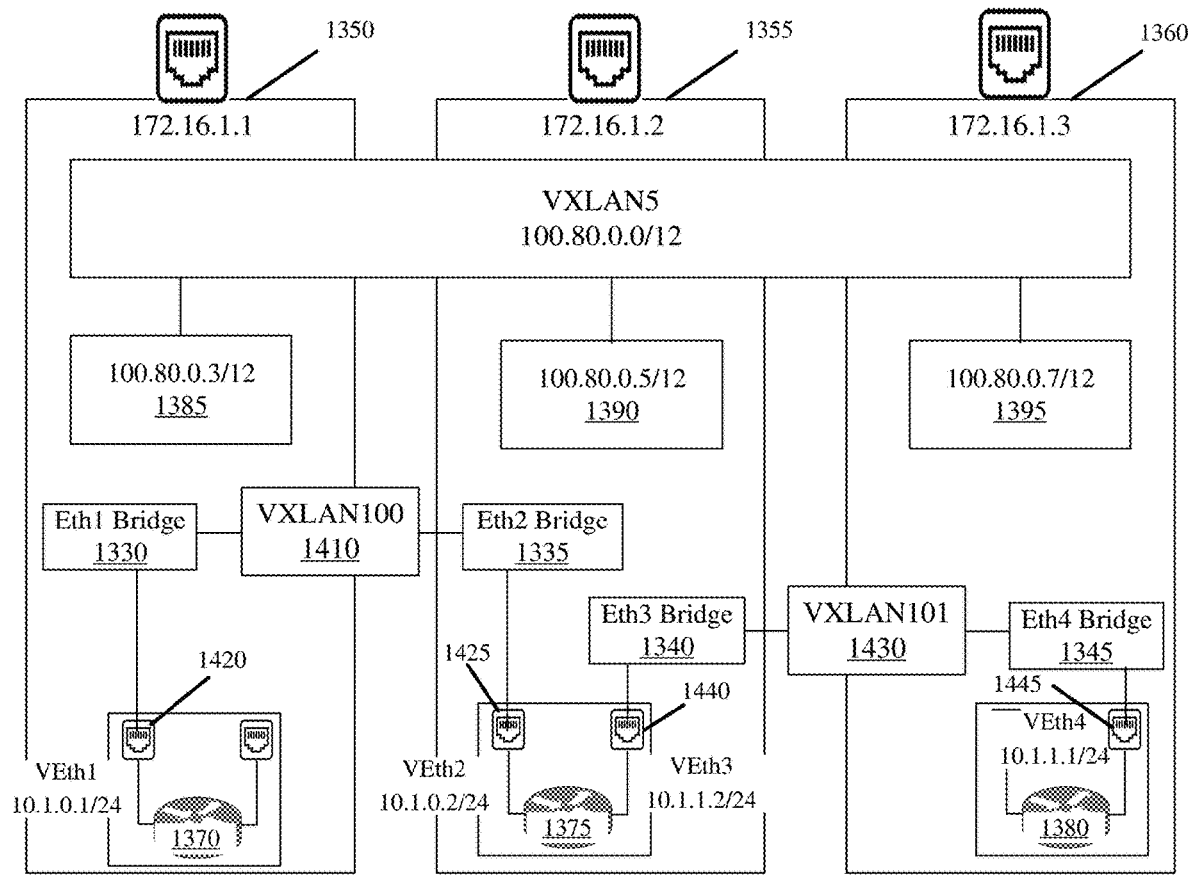
FIG. 14 illustrates creating a direct logical connection for a physical link between hardware network devices in the two-layer nested virtualized network.
Figure 14:
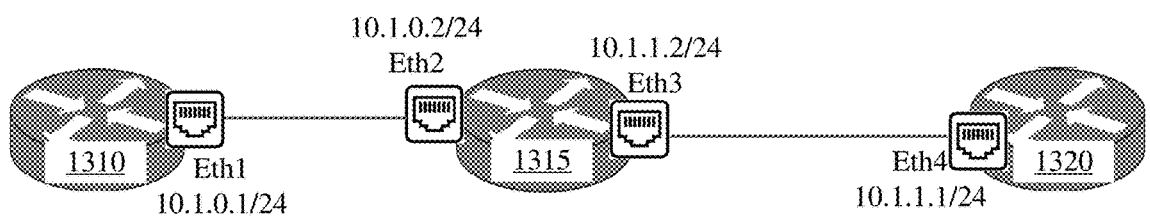

Referring back to FIG. 12, process 1200 may include creating (at 1285) a second-tier VXLAN for each direct link that exists in the target physical network and connecting (at 1290) the second-tier bridges to the second-tier VXLANs in a manner that recreates and/or mirrors the physical links between the hardware network devices of the target physical network. FIG. 14 illustrates creating a direct logical connection for a physical link between hardware network devices in the two-layer nested virtualized network.

FIG. 14 illustrates creating a first VXLAN 1410, connecting second-tier bridge 1330 to the first VXLAN 1410 and to the virtual network interface 1420 of emulated network device 1370, and connecting second-tier bridge 1335 to the first VXLAN 1410 and to the virtual network interface 1425 of emulated network device 1375 in order to create a direct logical connection for the physical link between hardware network devices 1310 and 1315. The direct logical connection mirrors the physical link since the virtual network interfaces 1420 and 1425, that are the endpoints of the direct logical connection, are assigned the same addressing as the physical network interfaces of hardware network devices 1310 and 1315 that are the endpoints of the physical link. FIG. 14 also illustrates creating a second VXLAN 1430, connecting second-tier bridge 1340 to the second VXLAN 1430 and to the second virtual network interface 1440 of emulated network device 1375, and connecting second-tier bridge 1345 to the second VXLAN 1430 and to the virtual network interface 1445 of emulated network device 1380 in order to create a second direct logical connection for the physical link between hardware network devices 1315 and 1320. The orchestrator may execute example commands "brctl addbr [bridge name]" and "up link set dev [bridge name] up" to create a second-tier bridge on a cloud instance, execute example commands "ip link add [VXLAN name] type vxlan id [VXLAN identifier] dstport 4789 dev [bridge name]" to connect a second-tier bridge to a second-tier VXLAN, and execute example command "brctl addif [bridge name] [VXLAN name] [virtual network interface name]" to connect a virtual network interface to a second-tier bridge.

The process 1200 may include creating (at 1295) forwarding entries for the second-tier VXLANs to identify endpoints for each direct logical connection. For instance, and with reference to FIG. 14, a forwarding entry may be created for VXLAN 1410 on cloud instance 1350 to forward outgoing frames, packets, messages, and/or other data received by second-tier bridge 1330 to the address assigned to first-tier bridge 1390 on cloud instance 1355. A corresponding forwarding entry may be created for VXLAN 1430 on cloud instance 1355 to forward outgoing frames, packets, messages, and/or other data received by second-tier bridge 1335 to the address assigned to first-tier bridge 1385 on cloud instance 1350. The orchestrator may execute the example command "bridge fdb append 00:00:00:00:00:00 dev [second-tier bridge 1330 identifier] dst 100.80.0.5" to create the forwarding entry for VXLAN 1410 on cloud instance 1350.

At this stage, the endpoints for the direct logical connections created in the two-layer nested virtualized network may have identical addressing as the corresponding endpoints for the physical links between hardware network devices in the target physical network, and the direct logical connections may mirror the physical links between the hardware network devices in the target physical network. Therefore, the logical topology of the two-layer nested virtualized network may mirror the physical topology of the target physical network. The emulated network devices may then commence operation.

In some embodiments, the emulated network devices commence operation by exchanging addressing information with other emulated network devices that are directly connected based on the direct logical connections created by the set of secondary VXLANs. After some duration, the emulated network devices reach a steady state that matches a steady state of the target physical network, and more specifically, with the configurations of the emulated network devices matching the configurations of the hardware network devices, wherein upon reaching the steady state, the configurations of the emulated network devices recreate the various addressing and routing tables present in the corresponding hardware network devices of the target physical network.

Upon reaching the steady state, the emulated network devices, and more specifically, the network device images of the emulated network devices have the same connectivity, addressing, and native communications as the hardware network devices in the target physical network. The replicated network can therefore mirror the layer 2 broadcasts, addressing/connectivity information, and packet forwarding that occur between the hardware network devices of the target physical network. In other words, the two-tier nested virtualized network mirrors the direct connectivity and native communication between the network hardware devices of the target physical network, and frames, packets, messaging, and/or other data routed in the target physical network will be identically routed in the two-tier nested virtualized network.

Figure 15:
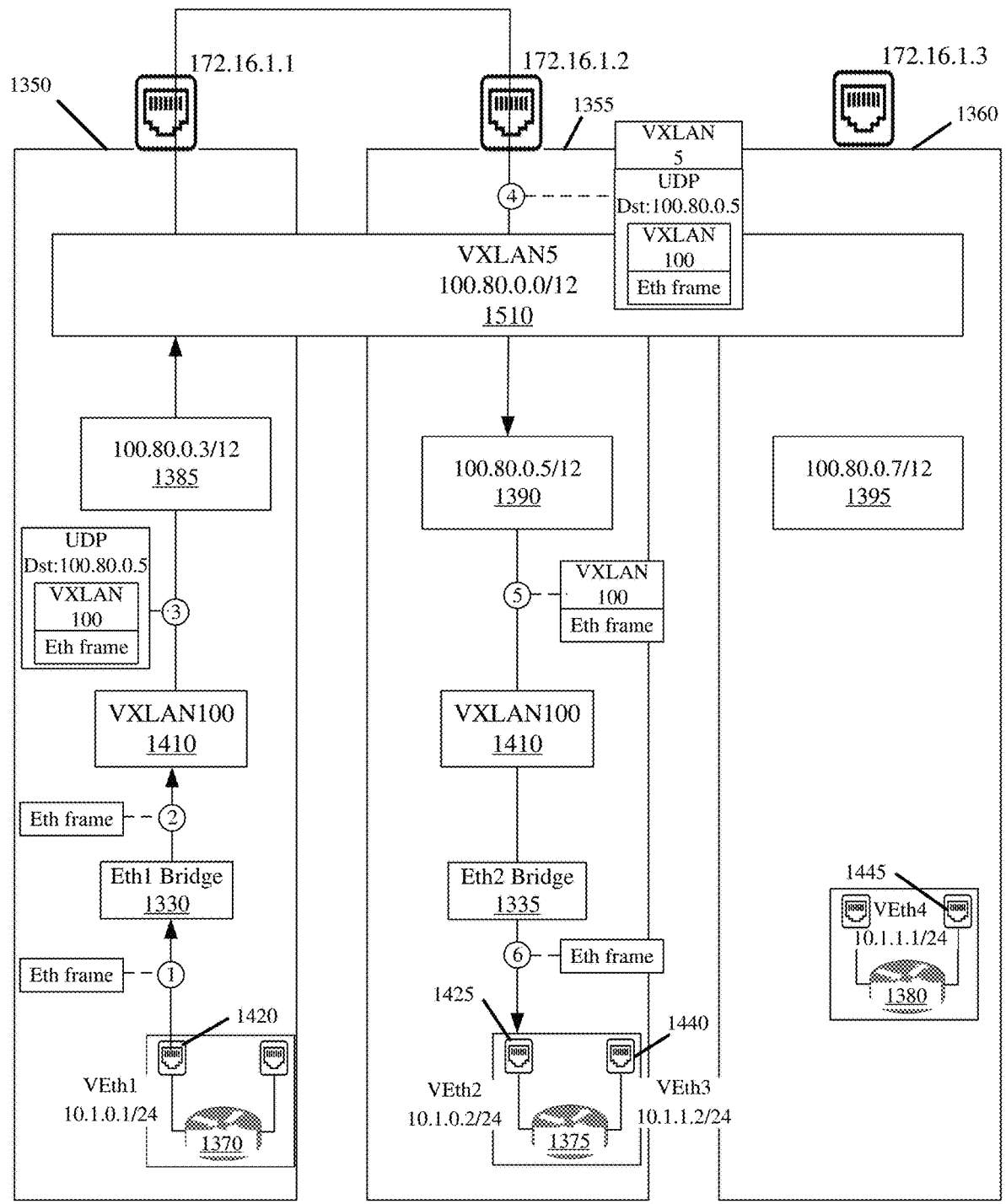
FIG. 15 conceptually illustrates the flow of data through a two-layer nest virtualized replicated network that mirrors native communications in a target physical network in accordance with some embodiments.

FIG. 15 conceptually illustrates the flow of data through a two-layer nest virtualized replicated network that mirrors native communications in a target physical network in accordance with some embodiments. In particular, FIG. 15 illustrates an initial exchange in the replicated network, that would also occur in the target physical network, with which network devices discover one another and/or build routing tables. In the target physical network, the hardware network devices discover devices that are endpoints on the same physical link (e.g., directly connected), while in the replicated network, the emulated network devices discover devices that are at opposite endpoints of the direct logical connections that recreate the physical links (e.g., direct connections) between the hardware network device in the target physical network.

To initiate the discovery, emulated network device 1370 may issue (at 1) an ethernet frame with the broadcast MAC address from virtual network interface 1420. The virtual network interface 1420 may be connected to second-tier bridge 1330, and second-tier bridge 1330 may receive the ethernet frame from virtual network interface 1420.

The second-tier bridge 1330 is also connected to second-tier VXLAN 1410. Accordingly, the second-tier bridge 1330 forwards (at 2) the ethernet frame to second-tier VXLAN 1410.

The forwarding entry for the second-tier VXLAN 1410 identifies the address of first-tier bridge 1390 on different cloud instance 1355. To route according to the forwarding entry, a VXLAN encapsulation scheme is performed whereby a VXLAN header identifying the second-tier VXLAN 1410 is added to ethernet frame and the VXLAN header and ethernet frame are encapsulated in a User Datagram Protocol (UDP) packet with a destination address set to the address from the forwarding entry (e.g., the address of first-tier bridge 1390).

The UDP packet passes (at 3) from the second-tier bridge 1310 to the first-tier bridge 1385 operating on the same cloud instance 1350. The first-tier bridge 1385 is connected to first-tier VXLAN 1510. The UDP packet then passes with a second VXLAN header from cloud instance 1350 through first-tier VXLAN 1510 to cloud instance 1355. In some embodiments, when first-tier VXLAN 1510 is established and/or connected to cloud instances 1350, 1355, and 1360, one or more ARP exchanges may occur. From the ARP exchanges, each cloud instance 1350, 1355, and 1360 may learn the MAC address of other cloud instances 1350, 1355, and/or 1360 where the IP address assigned to a connected first-tier bridge 1385, 1390, and/or 1395 is accessible. As a result, the UDP packet specifying the destination address of first-tier bridge 1390 will route over first-tier VXLAN 1510 from cloud instance 1350 to cloud instance 1355.

First-tier bridge 1390 on cloud instance 1355 then receives the UDP packet, and accepts the UDP packet because the destination address matches the address that is assigned to the first-tier bridge 1390. The first-tier bridge 1390 forwards (at 5) the first VXLAN header with the ethernet frame through second-tier VXLAN 1410 to second-tier bridge 1335 that is connected to VXLAN 1410 identified in the first VXLAN header. The first VXLAN header is removed and the ethernet frame is forwarded (at 6) to the virtual network interface 1425 of emulated network device 1375 that is connected to the second-tier bridge 1335. The emulated network device 1425 determines that it is directly connected, via an obfuscated direct logical connection, to emulated network device 1420, and/or learns the layer 2 addressing of emulated network device 1420 from the ethernet frame.

In some embodiments, an emulated network device may run the network device image from within a virtual machine rather than a container. The process for creating the two-layer nested virtualized network remains mostly the same except that the emulated network device running from the virtual machine may use tap interfaces instead of virtual ethernet container network interfaces. Accordingly, in some embodiments, the orchestrator launches the emulated network device by installing the virtual machine containing the network device image within a cloud instance, and creating one or more tap interfaces, as substitutes for the virtual network interfaces, to connect the second-tier virtual machine to a second-tier bridge of the cloud instance.

The replicated network has thus far been described with reference to a target physical network, and more specifically, to mirroring the connectivity and native communications of the hardware network devices from a target physical network. It should be apparent that the replicated network may also be created in the cloud for planning, testing, and/or validating a target physical network before the target physical network is built. Similarly, the replicated network may be created in the cloud for experimentation, training, research and development, and/or other purposes where a network is needed, but creating the target physical network would incur too much cost and/or time. Accordingly, the replicated network can be created in the cloud to mirror a hypothetical or desired network even without a target physical network.

III. Network Validation

The replication of the target physical network in the cloud provides a safe environment to holistically and comprehensively validate any changes to the target physical network before deployment thereto. In particular, the replicated network reproduces the exact end state that would result on the target physical network if one or more configuration changes are made to one or more of the hardware network devices rather than corresponding emulated network devices of the replicated network, wherein the end state differs from the steady state by at least one changed network path, changed addressing, changed routing behavior, changed security behavior, etc. The ability to detect all such changes in a safe environment is extremely valuable to any network operator, and is especially valuable to operators of large networks in which comprehensive and holistic observation of the end state would be impossible to detect, test, or predict because of the sheer number of variables and interrelationships.

Figure 16:
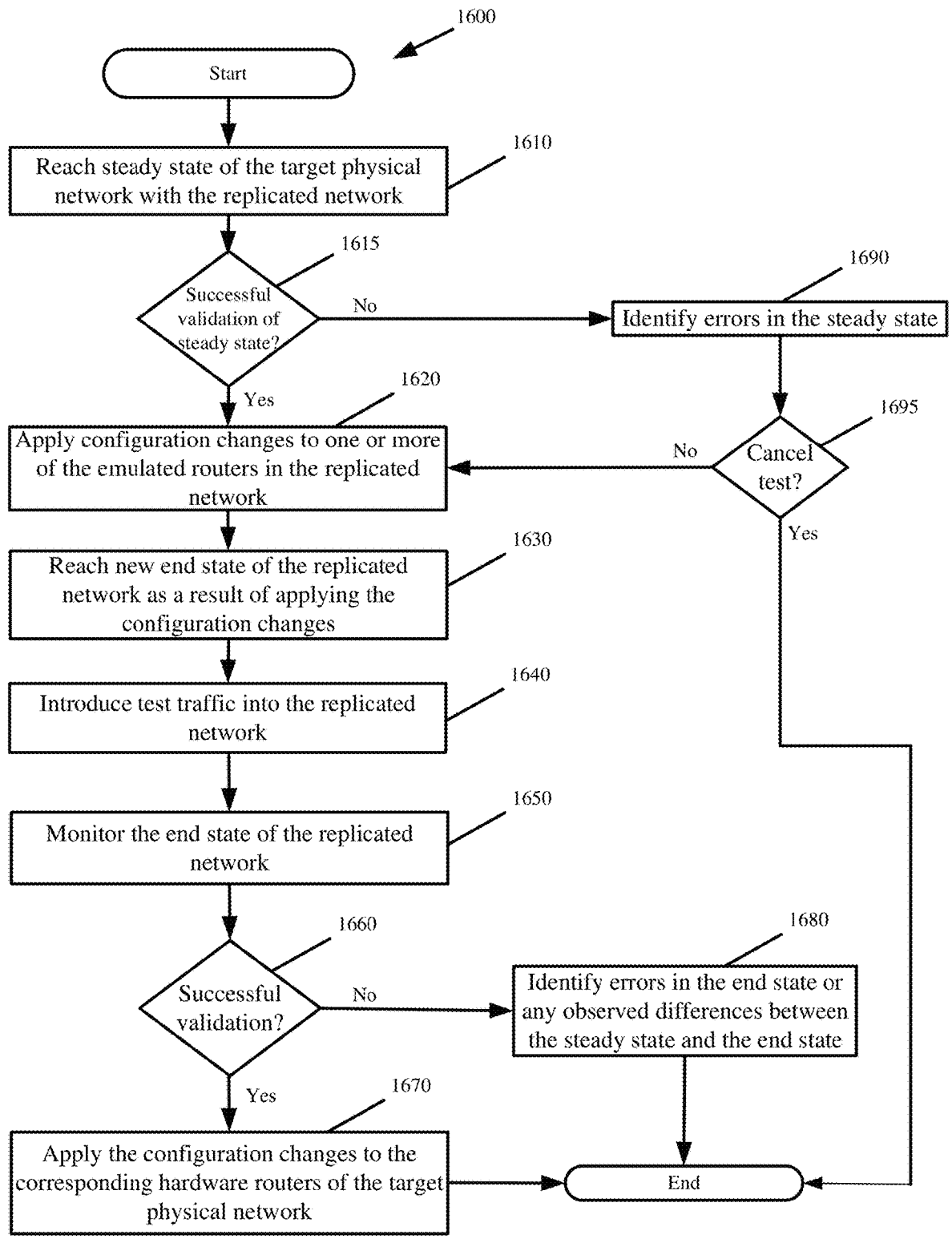
FIG. 16 presents a process for validating a configuration change intended for a target physical network through the replicated network of some embodiments.

FIG. 16 presents a process 1600 for validating a configuration change intended for a target physical network through the replicated network of some embodiments. The process commences in response to replicating the direct connectivity and native communications of the target of physical network in the cloud according to the methodologies described above. Before validation of a configuration change is made, the process executes the emulated network devices of the replicated network so that the replicated network arrives (at 1610) at the steady state of the target physical network that is replicated. Before the emulated network devices reach the steady state, the emulated network devices exchange route and addressing information and build ARP, BGP, and other network routing tables from the exchanged information.

Once the steady state is achieved, an initial validation (at 1615) of the steady state is performed. This initial validation scans the steady state for any pre-existing errors including loops, blackholes, and other errors from improper addressing or connectivity. Pre-existing errors can void or otherwise compromise the end state resulting from a configuration change. In other words, the true end state resulting from a configuration change may not be reached because pre-existing errors prevent the configuration change from having the desired effect on the network or alter the effect the configuration change has on the network.

In response to detecting pre-existing errors in the steady state, the process may end or present (at 1690) the errors to the network administrator. The network administrator can then choose to correct the errors before testing the configuration changes or move ahead (at 1695) with the test despite the identified errors.

In response to successfully validating the steady state with no errors, the process applies (at 1620) one or more configuration changes under test to one or more of the emulated network devices. This can include introducing new addressing, pulling existing advertised addressing, changing routing or forwarding policies, or simulating a failure of one or more emulated network devices or interconnection links as some examples. The configuration changes are intended for a specific set of hardware network devices of the target physical network and are therefore applied to the set of emulated network devices that emulate that specific set of hardware network devices with the same connectivity, addressing, and native communication.

Some additional period of time passes until the replicated network reaches (at 1630) the end state that results from the one or more configuration changes. Again, the amount of time depends on the ripple effect or propagation time of the changes through the replicated network and the number of emulated network devices impacted by the changes. The end state is reached once no additional changes are made to any of the routing or addressing tables of the emulated network devices.

Optionally, the process introduces (at 1640) test traffic into the replicated network. The test traffic can expedite the propagation of the configuration changes throughout the network and can also be used to test the response of the replicated network after the end state is reached. The test traffic can also be an indication of when the end state is reached. In particular, when the routing of the test traffic is complete, the end state can be analyzed. In some embodiments, the test traffic is a sampling of the network traffic from the target physical network. In some embodiments, the test traffic simulates different attacks or desired conditions.

The process monitors (at 1650) the end state of the replicated network. In some embodiments, the monitoring involves detecting black holes (i.e., connectivity issues) or loops that form anywhere in the replicated network as a result of the applied changes. In some embodiments, the monitoring involves taking snapshots of the emulated network device routing and addressing tables and comparing the snapshots against routing and addressing table snapshots taken from the emulated network devices at the steady state prior to applying the configuration changes at step 1620. In some embodiments, the monitoring involves running a series of scripts, test cases, pings, traceroutes, etc. to detect connectivity issues or observe the routing or forwarding behavior of the emulated network devices. From such monitoring, erroneous or anomalous behavior including improper forwarding or routing of packets, packet loss, and improper modification of packets can be detected.

The process validates (at 1660) the end state based on whether the monitoring detected any error or anomalous behavior. If the end state is successfully validated without any errors or anomalous behavior, the process applies (at 1670) the configuration changes to the corresponding hardware network devices of the target physical network. In response to unsuccessful validation, the process identifies (at 1680) any errors in the end state or any observed differences between the steady state and the end state. A network administrator can then determine if the end state is desired or if the configuration changes require modification.

IV. System

Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 17:
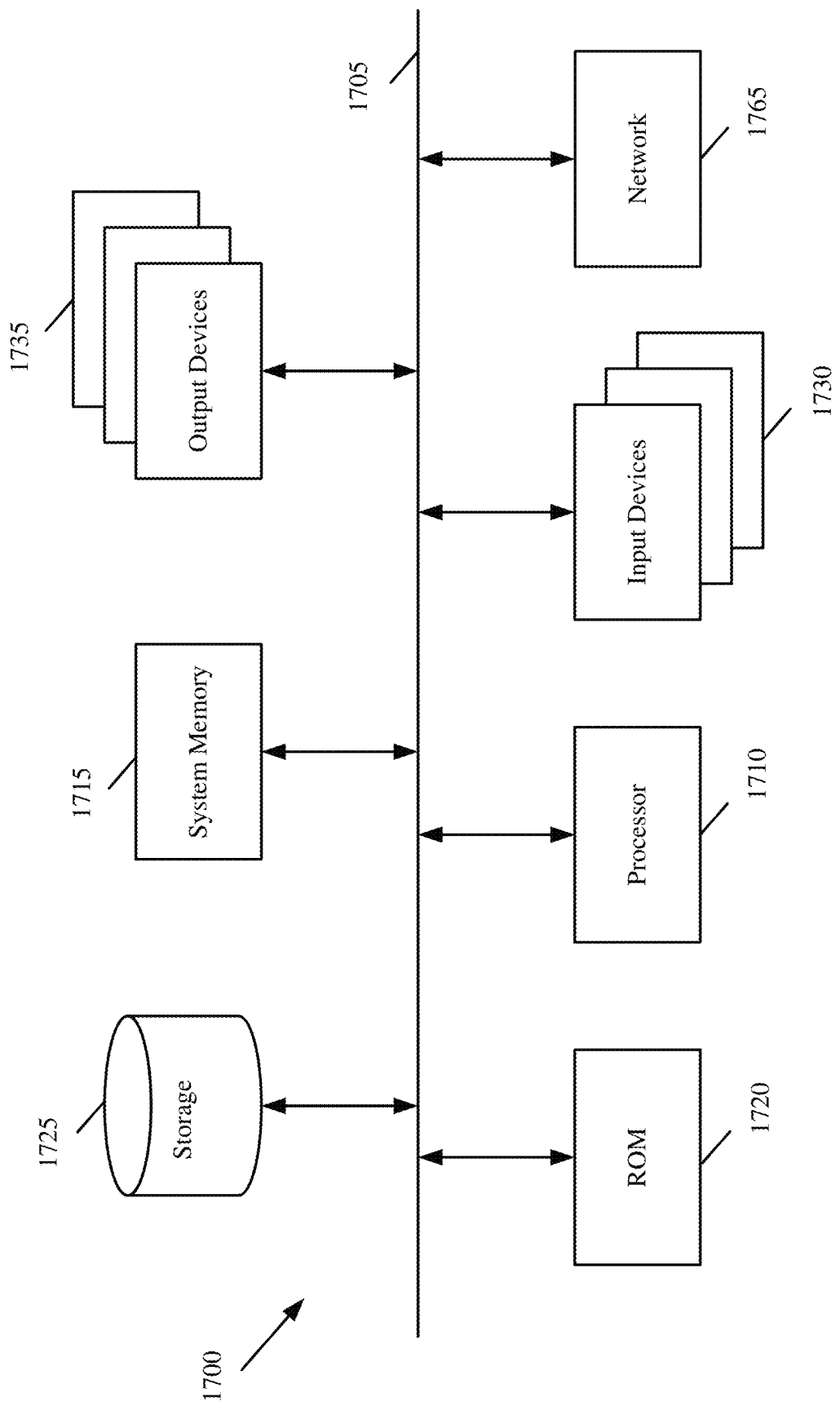
FIG. 17 illustrates a computer system or server with which some embodiments are implemented.

FIG. 17 illustrates a computer system or server with which some embodiments are implemented. Such a computer system includes various types of computer-readable mediums and interfaces for various other types of computer-readable mediums that implement the various methods and machines described above (e.g., orchestrator, machines on which the virtual machines execute, etc.). Computer system 1700 includes a bus 1705, a processor 1710, a system memory 1715, a read-only memory 1720, a permanent storage device 1725, input devices 1730, and output devices 1735.

The bus 1705 collectively represents all system, peripheral, and chipset buses that communicatively connect the numerous internal devices of the computer system 1700. For instance, the bus 1705 communicatively connects the processor 1710 with the read-only memory 1720, the system memory 1715, and the permanent storage device 1725. From these various memory units, the processor 1710 retrieves instructions to execute and data to process in order to execute the processes of the invention. The processor 1710 is a processing device such as a central processing unit, integrated circuit, graphical processing unit, etc.

The read-only-memory (ROM) 1720 stores static data and instructions that are needed by the processor 1710 and other modules of the computer system. The permanent storage device 1725, on the other hand, is a read-and-write memory device. This device is a non-volatile memory unit that stores instructions and data even when the computer system 1700 is off. Some embodiments of the invention use a mass-storage device (such as a magnetic or optical disk and its corresponding disk drive) as the permanent storage device 1725.

Other embodiments use a removable storage device (such as a flash drive) as the permanent storage device Like the permanent storage device 1725, the system memory 1715 is a read-and-write memory device. However, unlike storage device 1725, the system memory is a volatile read-and-write memory, such as random access memory (RAM). The system memory stores some of the instructions and data that the processor needs at runtime. In some embodiments, the processes are stored in the system memory 1715, the permanent storage device 1725, and/or the read-only memory 1720.

The bus 1705 also connects to the input and output devices 1730 and 1735. The input devices enable the user to communicate information and select commands to the computer system. The input devices 1730 include alphanumeric keypads (including physical keyboards and touchscreen keyboards), pointing devices. The input devices 1730 also include audio input devices (e.g., microphones, MIDI musical instruments, etc.). The output devices 1735 display images generated by the computer system. The output devices include printers and display devices, such as cathode ray tubes (CRT) or liquid crystal displays (LCD).

Finally, as shown in FIG. 17, bus 1705 also couples computer 1700 to a network 1765 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 1700 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable Blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
   creating a first-tier virtual machine on two or more physical machines that are not directly connected;
   creating a first-tier logical connection between the first-tier virtual machines of the two or more physical machines;
   launching an emulated network device within each first-tier virtual machine;
   creating a second-tier logical connection between each emulated network device running within each first-tier virtual machine of the two or more physical machines, wherein the second-tier logical connection is nested within the first-tier logical connection;
   exchanging layer 2 messaging between the emulated network devices via the second-tier logical connection nested within the first-tier logical connection.

2. The method of claim 1 further comprising identifying a physical link between first and second hardware network devices in a data network.

3. The method of claim 2 further comprising replicating the physical link between the hardware network devices by configuring a virtual network interface of a first emulated network device with an address assigned to a physical network interface of the first hardware network device that is connected to the physical link, and configuring a virtual network interface of a second emulated network device with an address assigned to a physical network interface of the second hardware network device that is connected to the physical link.

4. The method of claim 3 further comprising, wherein addressing for accessing the two or more physical machines is different than the addresses assigned to the physical network interface of the first hardware network device or the second hardware network device.

5. The method of claim 2 further comprising providing each emulated network device network access through at least one virtual network interface having an address matching addressing for a physical network interface of one of the first and second hardware network devices.

6. The method of claim 1, wherein said exchanging comprises passing an ethernet frame from one of the emulated network devices and receiving the ethernet frame as issued at another one of the emulated network devices.

7. The method of claim 1, wherein creating the first-tier logical connection comprises creating a first Virtual Extensible Local Area Network (VXLAN), creating a first-tier bridge in each first-tier virtual machine, and connecting each first-tier bridge to the first VXLAN.

8. The method of claim 7, wherein creating the second-tier logical connection comprises creating a second VXLAN, creating a second-tier bridge in each first-tier virtual machine, connecting each second-tier bridge to a virtual network interface of the emulated network device running on the first-tier virtual machine as the second-tier virtual bridge, and connecting each second-tier bridge to the second VXLAN.

9. A method comprising:
   identifying a first address of a physical network interface of a first hardware network device, and a second address of a physical network interface of a second hardware network device, wherein a direct physical link exists between the physical network interfaces of the first and second hardware network devices;

creating a first logical connection between a first virtual machine and a second virtual machine running on different physical machines that are not directly connected;

creating a second logical connection within the first logical connection;

running a first emulated network device within the first virtual machine, and a second emulated network device within the second virtual machine;

configuring a virtual network interface of the first emulated network device with the first address, and a virtual network interface of the second emulated network device with the second address; and replicating the direct physical link between the first and second hardware network devices using the first and second emulated network devices by connecting the virtual network interface of the first emulated network device to the second logical connection as a first endpoint, and by connecting the virtual network interface of the second emulated network device to the second logical connection as a second endpoint.

10. The method of claim 9, wherein the first virtual machine is accessed using a third address, wherein the second virtual machine is accessed using a fourth address, and wherein the third address and the fourth address are different than the first address and the second address.

11. The method of claim 9 further comprising creating a first forwarding entry for the first logical connection that forwards an outgoing frame, packet, message, or data from the first virtual machine to a physical network interface of the physical machine running the second virtual machine, and creating a second forwarding entry for the first logical connection that forwards an outgoing frame, packet, message, or data from the second virtual machine to a physical network interface of the physical machine running the first virtual machine.

12. The method of claim 11 further comprising creating, on each of the first virtual machine and the second virtual machine, a first-tier bridging interface with an address that is different than an address assigned to the physical network interface of the physical machine running the first virtual machine or the physical machine running the second virtual machine.

13. The method of claim 12 further comprising connecting each first-tier bridging interface to the first logical connection.

14. A method comprising:

instantiating a plurality of first-tier virtual machines on hardware resources of a distributed set of physical machines, wherein said instantiating comprises providing a first-tier virtual machine for each hardware network device of a plurality of hardware network devices, and wherein each first-tier virtual machine comprises a physical network interface with an Internet Protocol (IP) address different than IP addresses assigned to physical network interfaces of the plurality of hardware network devices;

instantiating a plurality of second-tier virtual machines within the plurality of first-tier virtual machines, wherein each second-tier virtual machine of the plurality of second-tier virtual machines comprises at least one virtual network interface with an IP address matching an IP address at a physical network interface of a different hardware network device of the plurality of hardware network devices, and wherein each second-tier virtual machine executes a network device image emulating functionality and operation of a hardware network device from the plurality of hardware network devices;

creating a plurality of direct logical connections that terminate at different pairs of virtual ethernet interfaces, wherein each pair of virtual ethernet interfaces that terminates a different direct logical connection has identical addressing to a pair of physical network interfaces that terminate a corresponding physical link between a pair of the plurality of hardware network devices; and routing frames between the plurality of second-tier virtual machines through the direct logical connections to match routing of frames between physical links established between different pairs of the hardware network devices.

15. The method of claim 14 further comprising mirroring routing information and operation of the plurality of hardware network devices through routing information and operation of the plurality of second-tier virtual machines based on said routing.

16. The method of claim 14 further comprising configuring each network device image with a network configuration of a hardware network device from the plurality of hardware network devices.

17. The method of claim 16 further comprising changing the configuration of a hardware network device executed by the network device image of a particular second-tier virtual machine of the plurality of second-tier virtual machines.

18. The method of claim 17 further comprising detecting changes to routing information or routing operation of one or more second-tier virtual machines from the plurality of second-tier virtual machines in response to said changing the configuration.

19. The method of claim 14, wherein said instantiating the plurality of first-tier virtual machines comprises creating a first-tier tunnel, a first-tier Virtual Extensible Local Area Network (VXLAN), or a first-tier Virtual Local Area Network (VLAN), creating a first-tier bridge on each first-tier virtual machine of the plurality of first-tier virtual machines, and connecting each first-tier bridge to the first-tier tunnel, the first-tier VXLAN, or the first-tier VLAN.

20. The method of claim 19, wherein said creating comprises nesting a plurality of second-tier tunnels, a plurality of second-tier VXLANs, or a plurality of second-VLANs within the first-tier tunnel, the first-tier VXLAN, or the first-tier VLAN, and connecting each pair of virtual network interfaces as endpoints of a different second-tier tunnel, second-tier VXLAN, or second-tier VLAN.

* * * * *